United States Patent
Augustine et al.

(10) Patent No.: US 9,762,241 B1
(45) Date of Patent: Sep. 12, 2017

(54) PHYSICALLY UNCLONABLE FUNCTION CIRCUIT INCLUDING MEMORY ELEMENTS

(71) Applicant: Intel Corporation, Santa Clara, CA (US)

(72) Inventors: Charles Augustine, Portland, OR (US); Suriya Ashok Kumar, Portland, OR (US); Carlos Tokunaga, Hillsboro, OR (US); James W. Tschanz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/198,124

(22) Filed: Jun. 30, 2016

(51) Int. Cl.
 *H04L 9/08* (2006.01)
 *H03K 19/003* (2006.01)
 *H03K 19/177* (2006.01)
 *H04L 9/32* (2006.01)

(52) U.S. Cl.
 CPC ... *H03K 19/00315* (2013.01); *H03K 19/1776* (2013.01); *H04L 9/3278* (2013.01)

(58) Field of Classification Search
 CPC .......... H03K 19/00315; H03K 19/1776; H04L 9/3278
 See application file for complete search history.

(56) References Cited

U.S. PATENT DOCUMENTS

| | | | | |
|---|---|---|---|---|
| 9,083,323 B2 * | 7/2015 | Guo | ......................... | H03K 3/84 |
| 2010/0031065 A1 * | 2/2010 | Futa | ..................... | H03K 3/0315 |
| | | | | 713/194 |
| 2012/0146672 A1 * | 6/2012 | Winter | ................... | G11C 29/06 |
| | | | | 324/750.3 |
| 2013/0019324 A1 * | 1/2013 | Tehranipoor | ......... | H03K 3/0315 |
| | | | | 726/34 |
| 2013/0276151 A1 * | 10/2013 | Lewis | ..................... | G06F 21/70 |
| | | | | 726/34 |
| 2015/0101037 A1 * | 4/2015 | Yang | ....................... | G06F 21/44 |
| | | | | 726/16 |
| 2016/0013940 A1 * | 1/2016 | Augustine | ............. | H04L 9/0877 |
| | | | | 380/44 |

(Continued)

OTHER PUBLICATIONS

Armknecht, F., et al., "Memory Leakage-resilient encruption based on physically unclonable functions", Advances in Cryptology (ASIACRYPT) ser. LNCS, vol. 5912, (2009), 685-702.

(Continued)

*Primary Examiner* — Alexander H Taningco
*Assistant Examiner* — Kurtis R Bahr
(74) *Attorney, Agent, or Firm* — Schwegman Lundberg & Woessner, P.A.

(57) ABSTRACT

Some embodiments include apparatus and methods using a first ring oscillator, a second ring oscillator, and circuit coupled to the first and second ring oscillators. The first ring oscillator includes a first memory cell and a first plurality of stages coupled to the first memory cell. The second ring oscillator includes a second memory cell and a second plurality of stages coupled to the second memory cell. The circuit includes a first input node coupled to an output node of the first ring oscillator and a second input node coupled to an output node of the second ring oscillator. In one of such embodiments, the circuit can operate to generate identification information to authenticate the apparatus.

17 Claims, 14 Drawing Sheets

(56) References Cited

U.S. PATENT DOCUMENTS

2016/0269186 A1* 9/2016 Wallrabenstein ....... G06F 21/31
2016/0277025 A1* 9/2016 Tanamoto ............ H03K 19/003

OTHER PUBLICATIONS

Gassend, B., et al., "Controlled Physical Random Functions", ACSAC 02: Proceedings of the 18th Annual Computer Security Applications Conference, (2002), 149.
Lee, J. W., et al., "Building a secret key in integrated circuits for identification and authentication applications", Proc. Symp. VLSI Cirucits, (2004), 176-179.
Lee, S., "Internal resistor of the multi-functional tunnel barrier for selectivity and switching uniformity in resistive random access memory", Nanoscale Research Letters, (2014).
Lee, S., "Tunnel barrier engineering of titanium oxide for high non-linearity of selector-less resistive random access memory", Applied Physics Letters, (2014).
Lim, D., "Extracting Secret Keys from Integrated Circuits", Master's Thesis, MIT, MA, USA, (2004).
Lofstrom, W. R., et al., "IC Identification Circuit Using Device Mismatch", Proceedings of ISSCC 2000, (2000), 372-373.
Tamanna, N., et al., "Characteristics of TiOy Film by Optimizing Thickness and Trap Density for Selector-Less ReRAM", ECS Solid State Letters, (2014).

* cited by examiner

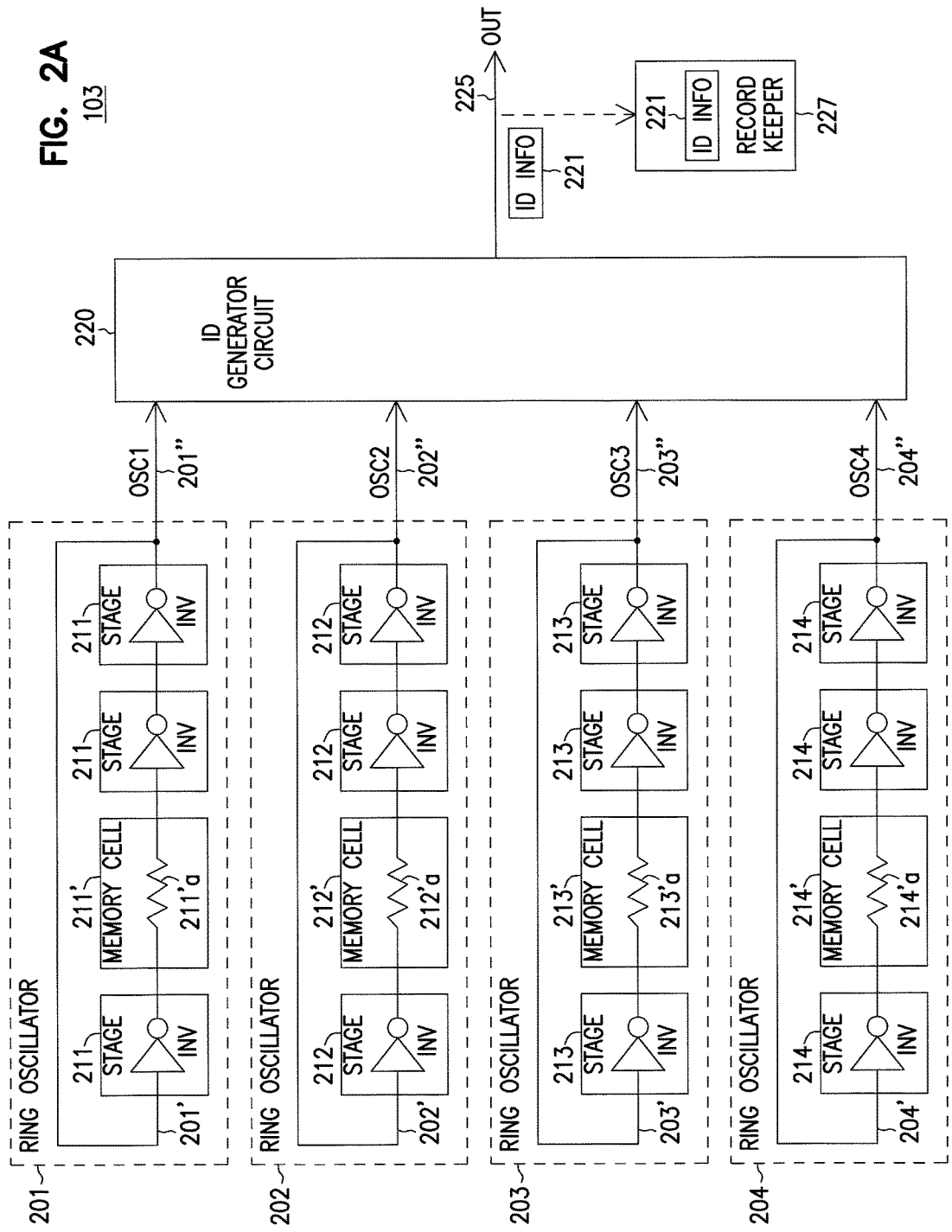

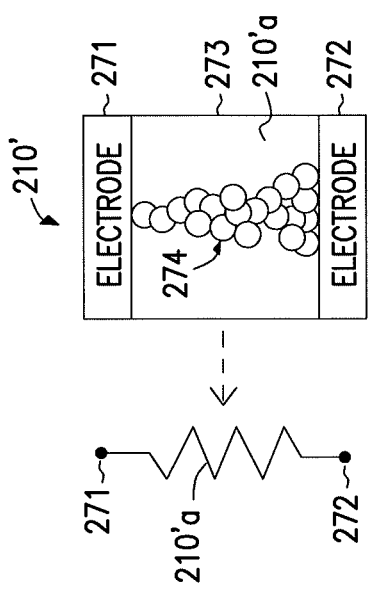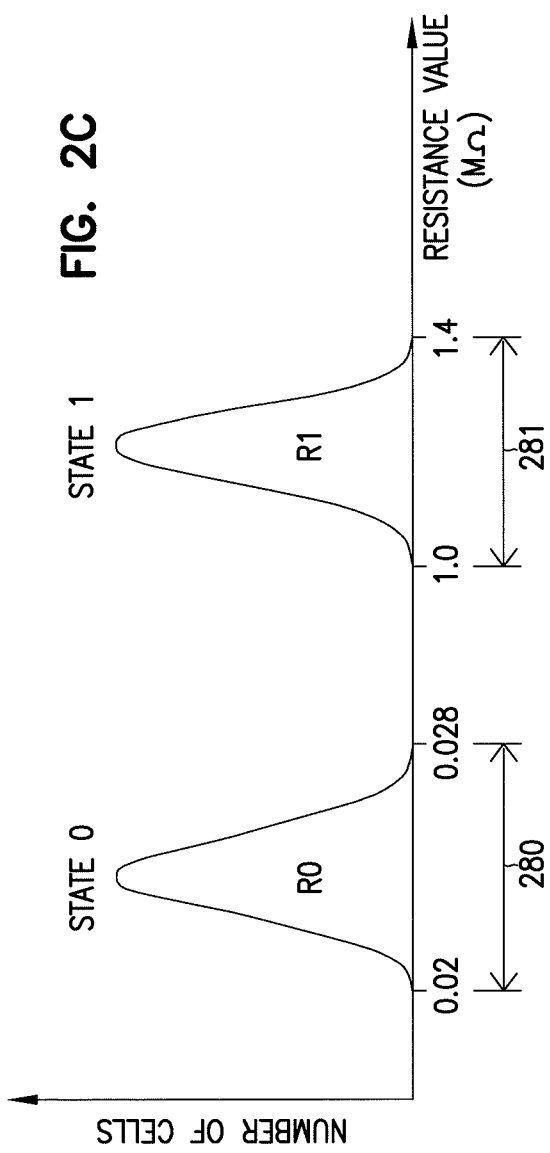

PHYSICALLY UNCLONABLE FUNCTION CIRCUIT INCLUDING MEMORY ELEMENTS

TECHNICAL FIELD

Embodiments described herein pertain to generation of unique identification for electronic items. Some embodiments relate to circuitry embedded in integrated circuit devices for authentication purposes.

BACKGROUND

Many integrated circuit (IC) manufacturers have techniques to authenticate their ICs. For example, some manufacturers may build special circuitry in their ICs for authentication purposes. In some situations, such circuitry may be replicated (e.g., cloned) by reverse engineering. However, variations in fabrication processes usually cause the structure of the replicated circuitry to be slightly different from the original circuitry. Therefore, the function of the replicated circuitry would not be the same as the function of the original circuitry. Thus, most circuitry used for authentication purposes have an inherent physically-unclonable function (PUF). Based on this PUF feature, using PUF circuits for product authentication is favorable for many manufacturers. However, some of these conventional PUF circuits may have constraints that are unsuitable to be built in some products (e.g., ICs). Such constraints may include large circuit area, excessive fabrication process overhead, high power consumption, and high cost.

BRIEF DESCRIPTION OF THE DRAWINGS

FIG. 2A shows a block diagram of the authentication unit of FIG. 1 including ring oscillators having memory cells, and an ID generator circuit coupled to the ring oscillators, according to some embodiments described herein.

FIG. 2B shows a structure of a memory cell, which can be included as each of the memory cells of the ring oscillators of the authentication unit of FIG. 2A, according to some embodiments described herein.

FIG. 2C shows resistance value ranges for different states that can be stored in the memory cell of FIG. 2B, according to some embodiments described herein.

DETAILED DESCRIPTION

The techniques described herein include an authentication unit embedded in a device (e.g., an IC), a system on a chip (SoC), or other electronic items. The described authentication unit includes ring oscillators and an identification (ID) generator circuit. Each of the ring oscillators includes stages (e.g., inverter stages) and at least one memory cell coupled to the stages. The ring oscillators can have the same structure. Each of the ring oscillators can generate a signal at its output node. However, variations in fabrication processes can cause the frequency of the signal from one ring oscillator to be different from the frequency of the signal from another ring oscillator. The ID generator circuit of the described authentication unit generates unique ID information (e.g., a code) for the device based on the differences in frequencies among the signals generated by the ring oscillators. The ID information can be used to authenticate the device.

As is known to those skilled in the art, generation of random and unique one-time encryption keys can be very difficult, especially if the keys are locally generated and not distributed by a master key management system. Similarly, generating unique IDs for products (e.g., semiconductor devices or systems) for authentication purposes can pose a challenge for the manufacturing industry. As mentioned above, PUF circuits are used by many manufacturers to authenticate their products. However, PUF circuits often face two challenges. For example, a correct product (e.g., IC) may be identified as a rogue product (false rejection rate, FRR). In another example, a rogue product may be identified as a correct product (false acceptance rate, FAR).

As mentioned above, the techniques described herein include an authentication unit embedded in a device or a system. Some of the improvements and benefits of the described authentication unit over some conventional PUF circuits include improved FAR (lower FAR), improved FRR (e.g., lower FRR), smaller circuit area, lower power consumption, lower cost, and other improvements and benefits, as described in more detail below.

Figure 1:
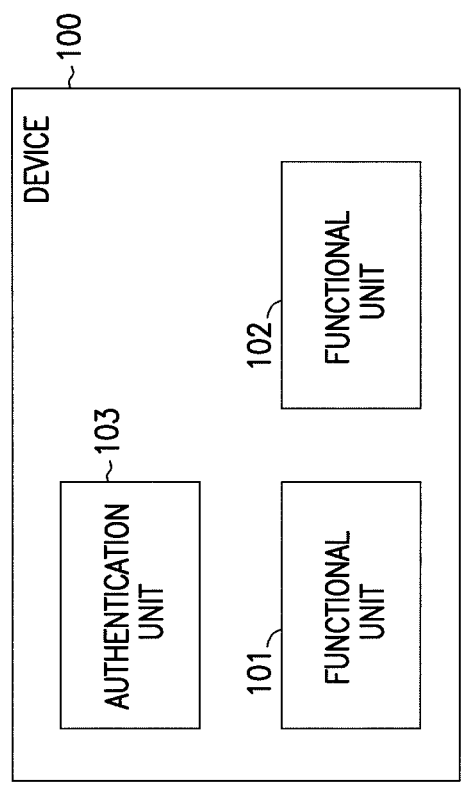
FIG. 1 shows an apparatus in the form of a device including functional units, and an authentication unit, according to some embodiments described herein.

FIG. 1 shows an apparatus in the form of a device 100 including functional units 101 and 102, and authentication unit 103, according to some embodiments described herein. Device 100 can include an IC (e.g., semiconductor chip). An example of device 100 includes a processor (e.g., general purpose processor, an application-specific integrated circuit (ASIC), or other types of processors), a memory device (e.g., dynamic random access memory (DRAM), a flash memory device, and other memory device), a system on chip (Soc), or other types of integrated circuits.

Device 100 of FIG. 1 can be included in an electronic device or system, such as a computer (e.g., server, desktop, laptop, or notebook), a solid state drive (SSD), a network device (e.g., Ethernet adapter, Ethernet controller, and other network devices), a tablet, a cellular phone, a wireless communication router, a digital television, an electronic wearable item (e.g., a smart watch or other wearable devices), other electronic devices or systems, and other Internet of Things (IoT) devices or systems.

In FIG. 1, functional units 101 and 102 can include any combination of logic circuitry (e.g., processing core of a processor or a control unit of a memory device), memory cells, and other components. A person skilled in the art would recognize that device 100 can include other components (e.g., components of a processor, a memory device, or other types of ICs). Such components are omitted from FIG. 1 so as to not obscure the description herein.

Authentication unit 103 of device 100 can generate unique ID information (e.g., an ID code) for authenticating device 100. For example, before installing device 100 in a product or before shipping device 100 to a customer, an operation can be performed using authentication unit 103 to generate ID information. The ID information can be logged (e.g., recorded) in a record keeper. For example, the ID information of device 100 can be electronically saved in a database in a computer or can be written on paper. Then, the ID information of device 100 can be compared with ID information obtained from a target device (e.g., target IC). The result of the comparison can indicate whether or not the target device is actually (or most likely to be) device 100. For example, the target device may be considered to be device 100 if the ID information from the target device matches the ID information from the record keeper. The target device may not be considered to be device 100 (e.g., may be considered a rouge device) if the ID information obtained from the target device does not match the ID information of device 100 from the record keeper.

FIG. 2A shows a block diagram of authentication unit 103 of FIG. 1 including ring oscillators 201, 202, 203, and 204 having memory cells 211', 212', 213', and 214', and an ID generator circuit 220, according to some embodiments described herein. Each of ring oscillators 201, 202, 203, and 204 can include series-connected stages (stages coupled in series with each other) between an input node and an output node of a respective ring oscillator. For example, ring oscillator 201 includes stages 211 coupled between an input node 201' and an output node 201". Ring oscillator 202 includes stages 212 coupled between an input node 202' and an output node 202". Ring oscillator 203 includes stages 213 coupled between an input node 203' and an output node 203". Ring oscillator 204 includes stages 214 coupled between an input node 204' and an output node 204".

As shown in FIG. 2A, each of the stages of ring oscillators 201, 202, 203, and 204 can include an inverter INV. Inverters in the same ring oscillator or in different ring oscillators can have the same structure. For example, inverter INV in each of the stages of ring oscillators 201, 202, 203, and 204 can include a complementary metal-oxide semiconductor (CMOS) inverter.

The stages of each of ring oscillators 201, 202, 203, and 204 can be arranged such that within the same ring oscillator, the output node (e.g., the output node of inverter INV) of a preceding stage is coupled to an input node (e.g., the input node of inverter INV) of a succeeding stage, and such that the output node of the last stage (the stage closest to ID generator circuit 220) is coupled (e.g., fed back) to the input node of the first stage (the stage farthest from ID generator circuit 220). The ring arrangement shown in FIG. 2A allows ring oscillators 201, 202, 203, and 204 to generate signals OSC1, OSC2, OSC3, and OSC4, respectively, such that each of signals OSC1, OSC2, OSC3, and OSC4 can be an oscillating signal (e.g., a self-oscillating signal).

ID generator circuit 220 can include input nodes coupled to respective output nodes 201", 202", 203", and 204" of ring oscillators 201, 202, 203, and 204 to receive signals OSC1, OSC2, OSC3, and OSC4. ID generator circuit 220 can operate to generate ID information (ID INFO) 221 for device 100. ID information 221 can be obtained based on a signal OUT at an output node 225 of authentication unit 103. Signal OUT can be a digital signal. For example, signal OUT can carry digital information (e.g., bits) that represents the value of ID information 221. A record keeper 227 can be used to save ID information 221 for authentication of device 100.

As shown in FIG. 2A, ring oscillators 201, 202, 203, and 204 can have the same components (e.g., same number of inverter stages and memory cells) and the same arrangements (e.g., same connections among the components). However, due to variations in fabrication processes, signals OSC1, OSC2, OSC3, and OSC4 generated by ring oscillators 201, 202, 203, and 204, respectively, may have different frequencies. ID generator circuit 220 can generate ID information 221 based on the differences in the frequencies among signals OSC1, OSC2, OSC3, and OSC4. Different examples of ID generator circuit 220 and its operations are shown and described in detail with reference to FIG. 3, FIG. 4, and FIG. 5.

As shown in FIG. 2A, ring oscillators 201, 202, 203, and 204 can include memory cells 211', 212', 213', and 214', respectively. Each of memory cells 211', 212', 213', and 214' can be coupled in series with respective stages (e.g., inverter stages) within the same ring oscillator. For example, in ring oscillator 201, memory cell 211' is coupled in series with stages 211 between input node 201' and output node 201". In ring oscillator 202, memory cell 212' is coupled in series with stages 212 between input node 202' and output node 202". In ring oscillator 203, memory cell 213' is coupled in series with stages 213 between input node 203' and output node 203". In ring oscillator 204, memory cell 214' is coupled in series with stages 214 between input node 204' and output node 204". Thus, in a particular ring oscillator, the memory cell can include a terminal coupled to an output node of a preceding stage of the particular ring oscillator and another terminal coupled to an input node of a succeeding stage of the particular ring oscillator.

Memory cells 211', 212', 213', and 214' can have the same structure. For example, memory cells 211', 212', 213', and 214' can include memory elements 211'a, 212'a, 213'a, and 214'a, respectively, that can have the same structure. Each of memory elements 211'a, 212'a, 213'a, and 214'a can store a state. The value of the state stored in one memory element can be the same as or different from the value of the state stored in another memory element. However, storing different states in different memory elements may further increase differences in the frequencies of signals OSC1, OSC2, OSC3, and OSC4. This may further improve the strength of the value of ID information 221 generated based on differences in the frequencies of signals OSC1, OSC2, OSC3, and OSC4.

Each of memory cells 211', 212', 213', and 214' can include a resistive memory element (e.g., a resistive random access memory ((ReRAM) element). The value of the state stored in the memory element of a particular memory cell (among memory cells 211', 212', 213', and 214') can be based on the resistance value of the memory element in that particular memory cell.

FIG. 2A shows an example where each of memory cells 211', 212', 213', and 214' includes a ReRAM element (shown as a resistor symbol). However, memory cells 211', 212', 213', and 214' can include other types of memory cells as long as a state (e.g., information) can be stored (e.g., programmed) in memory cells 211', 212', 213', and 214'. For purposes of authentication of device 100, the state stored (e.g., stored in the memory element) in each of memory cells 211', 212', 213', and 214' can be permanent. This means that the stored state can be unchangeable after it is stored. For example, a one-time programmable process can be used to store a state in each of memory cells 211', 212', 213', and 214'.

FIG. 2A shows an example where the memory cell in a respective oscillator is located at a certain location in the respective oscillator. However, the memory cell in a respective oscillator can be located anywhere within the respective ring oscillator. For example, the memory cell in a respective oscillator can be located at location (e.g., immediately next to ID generator circuit 220) such that the memory cell can be directly coupled to the output node of the respective ring oscillator. As an example, instead of the arrangement shown in FIG. 2A, memory cell 211' in ring oscillator 201 can be directly coupled between inverter stage 211 and output node 201" of the ring oscillator 201. Similar arrangement can be applied to memory cells 212', 213', and 214' of ring oscillators 202, 203, and 204, respectively.

FIG. 2A shows an example where authentication unit 103 includes one memory cell in each of ring oscillators 201, 202, 203, and 204 as an example. However, authentication unit 103 can include multiple memory cells in each of ring oscillators 201, 202, 203, and 204. FIG. 2A shows authentication unit 103 including an odd number of three inverter stages in each of ring oscillators 201, 202, 203, and 204 as an example. However, authentication unit 103 can include any odd number (any odd number greater than one) of inverter stages in each of ring oscillators 201, 202, 203, and 204. Moreover, FIG. 2A shows authentication unit 103 including four ring oscillators 201, 202, 203, and 204 as an example. However, authentication unit 103 can include a different number of ring oscillators. Thus, in authentication unit 103, one or more of the number of ring oscillators, the number of stages (e.g., CMOS inverter stages) in each ring oscillator, and the number of memory cells (e.g., ReRAM cells) in each ring oscillator can be different from those shown in FIG. 2A.

FIG. 2B shows a structure of a memory cell 210', which can be included in authentication unit 103 as each of memory cells 211', 212', 213', and 214' of FIG. 2A, according to some embodiments described herein. As shown in FIG. 2B, memory cell 210' includes electrodes 271 and 272, and a dielectric portion 273 sandwiched between (e.g., directly contacting) electrodes 271 and 272. An equivalent symbol for memory cell 210' is also shown in FIG. 2B where electrodes 271 and 272 can correspond to terminals (e.g., two terminals) of memory cell 210' and memory element 210'a can correspond to the resistor of memory cell 210'.

Electrodes 271 and 272 and the dielectric portion 273 can have materials such that memory cell 210' can be a ReRAM cell. As an example, each of electrodes 271 and 272 can include conducive material (e.g., a layer of conductive material), such as metal (e.g., platinum (Pt) or other metals). Dielectric portion 273 can include oxide material (e.g., a layer of oxide material) or a combination of oxide materials. As an example, dielectric portion 273 can include hafnium oxide ($HfO_2$), titanium oxide ($TiO_x$ (e.g., $TiO_2$)), or tantalum pentoxide ($Ta_2O_5$), or any combination of these materials (e.g., only one of $HfO_2$, $TiO_x$, and $Ta_2O_5$, only two of $HfO_2$, $TiO_x$, and $Ta_2O_5$, or all $HfO_2$, $TiO_x$, and $Ta_2O_5$) or other dielectric material. The materials for electrodes 271 and 272, and dielectric portion 273, can be selected such that a conductive path (e.g., conductive filament) 274 can be formed in dielectric portion 273. Forming conductive path 274 can include applying voltages of different values to electrodes 271 and 272.

Dielectric portion 273 (or part of dielectric portion 273) can form memory element 210'a of memory cell 210'. Memory cell 210' can store a state in memory element 210'a. The value of the state stored in memory cell 210' can be based on the resistance value (e.g., resistance of conductive path 274) of dielectric portion 273 between electrodes 271 and 272.

FIG. 2C shows resistance value ranges for different states that can be stored in memory cell 210' of FIG. 2B, according to some embodiments described herein. As shown in FIG. 2C, memory cell 210' can store two different states, such as state 0 and state 1. For a number of memory cells similar to memory cell 210', state 0 can be within a resistance value range 280, which can include resistance values from 0.20 megaohms ($M\Omega$) to $0.28M\Omega$; state 1 can be within a resistance value range 281, which can include resistance values from $1.0M\backslash4\Omega$ to $1.4M\Omega$. Specific resistance values are used in FIG. 2C as an example. Each of resistance value ranges 280 and 281 can include resistance values different from those shown in FIG. 2C. As shown in FIG. 2C, resistance value ranges 280 and 281 include no-overlap in resistance values to allow a distinction between different states (e.g., state 0 and state 1) stored in memory cell 210'. Thus, based on the example of FIG. 2C, the resistance value (e.g., R1) corresponding to state 1 can be at least one and a half times the resistance value (e.g., R0) corresponding to state 0 ($R1 \geq 1.5R0$). For example, as shown in FIG. 2C, the minimum resistance value corresponding to state 1 is $1.0M\Omega$, which is at least one and a half times ($1.5*0.28\ M\Omega$) the maximum resistance value corresponding to state 0. The relationship $R1 \geq 1.5R0$ is used as an example. Resistance values R0 and R1 may have a different relation (e.g., $R1=nR0$, where n can be any number greater than 1).

As described above, memory cell 210' of FIG. 2B can be included in authentication unit 103 as each of memory cells 211', 212', 213', and 214' of FIG. 2A. Thus, each of memory cells 211', 212', 213', and 214' of FIG. 2A can store a state, such as state 0 or state 1 (FIG. 2C). The states stored in memory cells 211', 212', 213', and 214' can be the same or can be different.

Figure 2D:
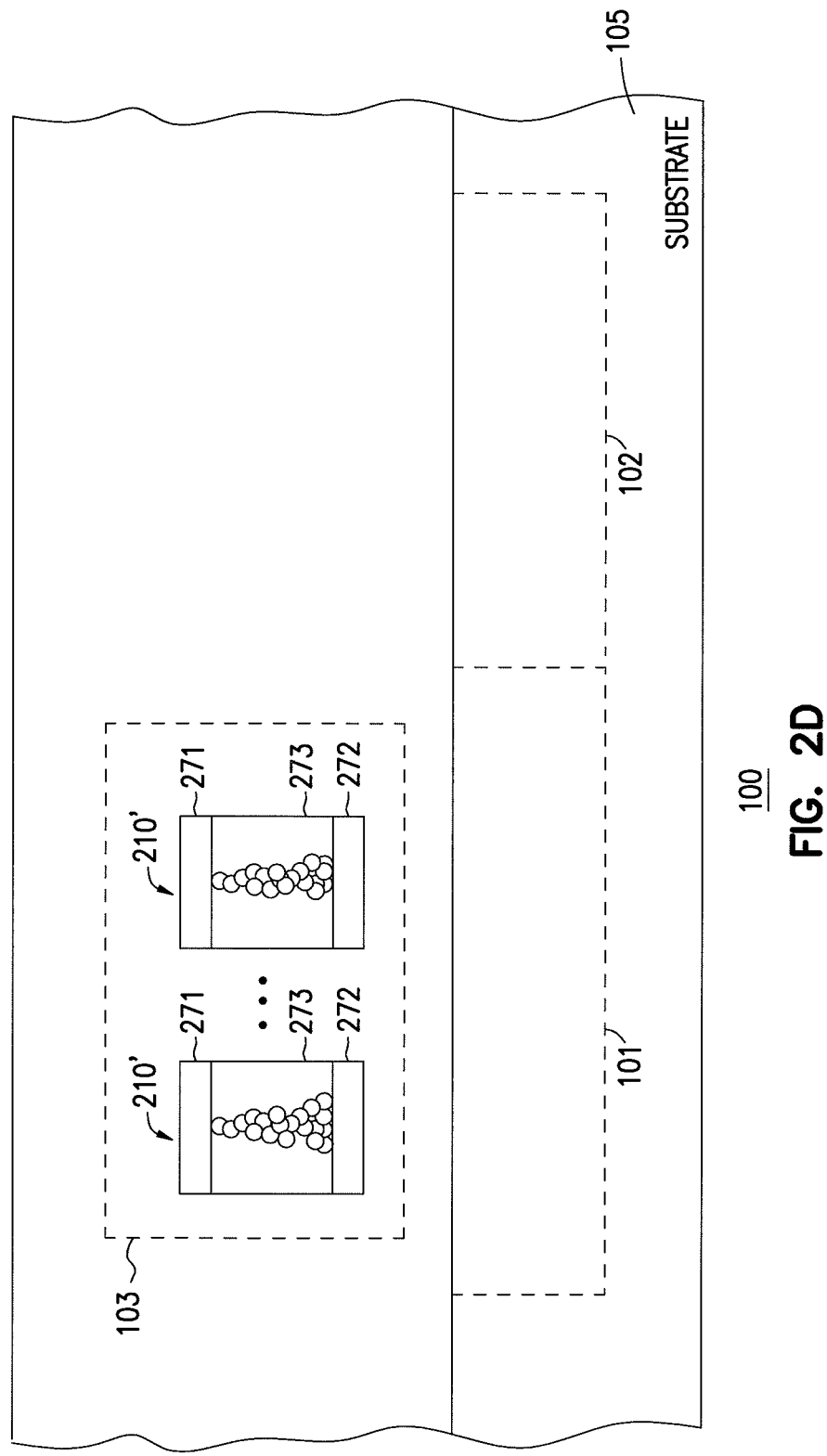
FIG. 2D shows a structure of part of the device of FIG. 1, including a substrate and the authentication unit formed over the substrate, according to some embodiments described herein.

FIG. 2D shows a structure of part of device 100 including a substrate 105 and authentication unit 103 having memory cells formed over substrate 105, according to some embodiments described herein. Substrate 105 can include a semiconductor substrate (e.g., a silicon die) where functional unit 101 (which can include logic circuitry) and functional unit 102 are formed. For simplicity, only outlines of the structures of functional units 101 and 102 and authentication unit 103 of device 100 are shown in FIG. 2D.

As described above (FIG. 2A and FIG. 2B), authentication unit 103 can include ring oscillators 201, 202, 203, and 204 that have inverter stages and memory cells, in which each of the memory cells can include memory cell 210' (FIG. 2B). As shown in FIG. 2D, authentication unit 103 can include memory cells 210' formed over functional unit 101 and over substrate 105. Each memory cell 210' can be formed such that electrodes 271 and 272 and dielectric portion 273 can be arranged in a direction perpendicular to substrate 105 (e.g., a vertical direction with respect to substrate 105). For simplicity, some parts (e.g., inverter stages and other parts) of authentication unit 103 are omitted from FIG. 2D. Moreover, FIG. 2D shows the entire authentication unit 103 located (e.g., formed) at a location over functional unit 101 and over substrate 105 as an example. However, some parts of authentication unit 103 or the entire authentication unit 103 can be located (e.g., formed) at another location. For example, only memory cells of authentication unit 103 cells (e.g., memory cells 210') can be located over functional unit 101; other parts (e.g., inverter stages of the ring oscillators) of authentication unit 103 can be located at (e.g., formed in) substrate 105. Locating (e.g., forming) the memory cells of authentication unit 103 at one location (e.g., over substrate 105) and locating (e.g., forming) other parts (e.g., inverter stages of the ring oscillators) of authentication unit 103 at another location (e.g., in substrate 105) may avoid some fabrication process overhead associated with forming authentication unit 103.

Inclusion of memory cells 211', 212', 213', and 214' may further improve authentication unit 103 over some conventional techniques. For example, to generate unique ID information for authentication purposes, some conventional techniques use variations in transistor threshold voltages (e.g., Vt), variations in transistor switching speeds, or variation of operating speed of inverters in oscillators. In these conventional techniques, current variations (caused by threshold voltage variations) and threshold voltage variations have a quadratic/linear relationship (e.g., quadratic/linear dependence). Besides other improvements, the techniques described herein may further improve the relationships between currents and other parameters in authentication unit 103.

For example, in the techniques described herein, using memory cells 211', 212', 213', and 214' in ring oscillators 201, 202, 203, and 204 (FIG. 2A) may further cause a higher degree of variations in the currents among ring oscillators 201, 202, 203, and 204. This higher degree of current variations may in turn cause a higher degree of variations in the frequencies of signals OSC1, OSC2, OSC3, and OSC4. A higher degree of variations in the frequencies of signals OSC1, OSC2, OSC3, and OSC4 may improve the reliability and the value of ID information 221 (FIG. 2A).

As an example, using memory cell 210' (e.g., ReRAM memory cell) as each of memory cells 211', 212', 213', and 214', current variations in ring oscillators 201, 202, 203, and 204 can also be dependent on the thickness of dielectric portion 273 (e.g., thickness measuring in the direction (e.g., vertical direction) between electrodes 271 and 272). Such current variations and the thickness of dielectric portion 273 can have an exponential relationship (e.g., exponential dependence). The frequencies of signals OSC1, OSC2, OSC3, and OSC4 depend on the currents in ring oscillators 201, 202, 203, and 204. Therefore, in comparison with some conventional techniques, authentication unit 103 (FIG. 2A) may have a higher variation in the frequencies of signals OSC1, OSC2, OSC3, and OSC4 (e.g., due to an exponential relationship between variations in current and the thickness of dielectric portion 273). Higher variations in frequencies signals OSC1, OSC2, OSC3, and OSC4 may improve the reliability and value of ID information 221 of authentication unit 103 over some conventional techniques.

Moreover, in comparison with some conventional techniques, authentication unit 103 may occupy a smaller area (e.g., fewer inverter stages), may consume less power, and may have a lower cost. Further, memory cells 211', 212', 213', and 214' can be programmed on the fly (e.g., to store a state (e.g., state 0 or state 1)) in order to generate different challenge-response signal pairs (CRPs). This may increase the number of challenge-response pairs (CRPs), which can be used over the lifetime of device 100. Using authentication unit 103 in device 100 may also result in a lower false acceptance rate (FAR) and a lower false rejection rate (FRR) for device 100 and devices similar to device 100. This may improve yield for devices that include authentication unit 103.

Figure 3:
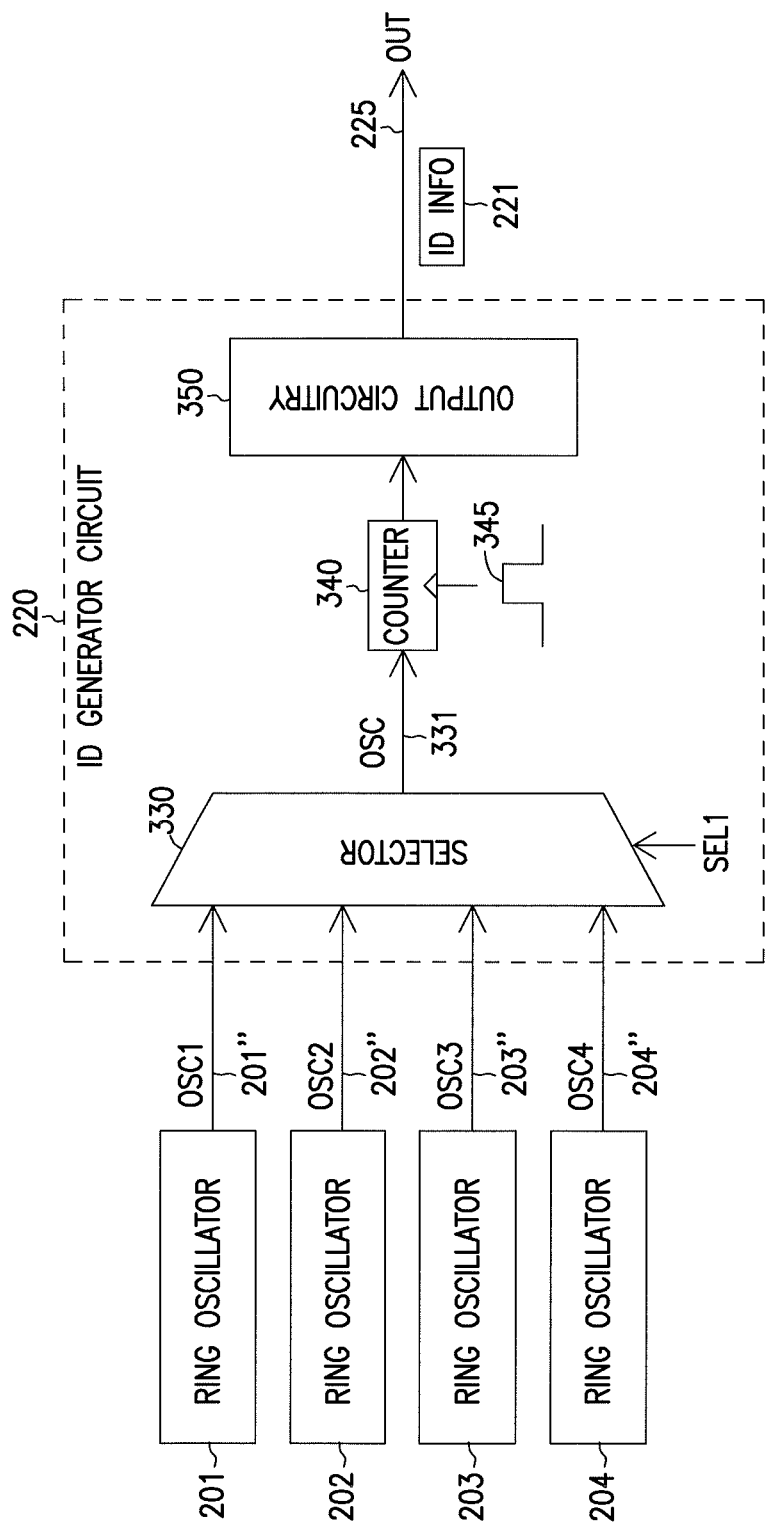
FIG. 3 shows a block diagram of the authentication unit of FIG. 2A including an ID generator circuit having a selector, a counter, and output circuitry, according to some embodiments described herein.

FIG. 3 shows a block diagram of authentication unit 103 of FIG. 2A including ID generator circuit 220 having a selector 330, a counter 340, and output circuitry 350, according to some embodiments described herein. FIG. 3 also shows ring oscillators 201, 202, 203, and 204 of authentication unit 103. However, for simplicity, detailed description of ring oscillators 201, 202, 203, and 204 is not repeated.

Selector 330 (which can include a multi-input single-output multiplexor) includes input nodes coupled to respective output nodes 201", 202", 203", and 204" of ring oscillators 201, 202, 203, and 204, respectively. Selector 330 can receive select information SEL1 to select one of signals OSC1, OSC2, OSC3, and OSC4 to be a signal OSC at an output node 331 of selector 330 (e.g., output node of the multiplexor of selector 330). Select information SEL1 can be in the form of a select signal (or select signals) that can include bits having different values to select different signals among signals OSC1, OSC2, OSC3, and OSC4. As described above with reference to FIG. 2A, signals OSC1, OSC2, OSC3, and OSC4 can have different frequencies. Thus, signal OSC can have different frequencies at different times, depending on which of signals OSC1, OSC2, OSC3, and OSC4 is selected by selector 330.

Counter 340 can include an input node coupled to output node 331 of selector 330 to receive signal OSC. Counter 340 can operate to generate a count that has a value based on the frequency (e.g., the number of periods) of signal OSC. For example, counter 340 can count the periods (cycles) of signal OSC during a particular time interval (e.g., a predetermined time interval) and generate a count (e.g., a digital number). The value of the count can be proportional to the number of periods of signal OSC during that particular time interval. For example, a pulse 345 can be provided to counter 340. The width of pulse 345 can be used as a time interval (duration) for the counting operation. Counter 340 can start counting the periods of signal OSC at the rising edge of pulse 345 and stop the counting at the falling edge of pulse 345.

The value of the count (count value) generated by counter 340 can include a number of bits, which can be based on the number of bits that can be handled by counter 340. For example, if counter 340 is an 8-bit counter, then the count value can include 8 bits.

Output circuitry 350 can generate signal OUT at output node 225 of authentication unit 103. The value of information carried by signal OUT can be based on the count value (which is based on the frequency of signal OSC). For example, if the count value is 10101010 (8 bits), then the value of information carried by signal OUT can be 10101010 (the same 8 bits). In this example, part of ID information 221 can include the value of a set of eight bits 10101010, which is based on the frequency of signal OSC (which is one of signals OSC1, OSC2, OSC3, and OSC4). Eight bits are used here as an example. The number of bits can vary. As described above with reference to FIG. 2A, ID information 221 can be obtained based on signal OUT.

The following description describes an example operation of authentication unit 103 where ID generator circuit 220 generates ID information 221 based on the frequencies of signals OSC1, OSC2, OSC3, and OSC4. In operation, in response to the value (e.g., binary value 00) of select information SEL1, selector 330 selects signal OSC1 and passes it to output node 331 as signal OSC. Counter 340 generates a count based on the frequency (e.g., the number of periods) of signal OSC (which is signal OSC1 selected by selector 330). For example, counter 340 may start to count (e.g., count up from an initial value (e.g., zero)) at the rising edge of pulse 345 and stop counting at the falling edge of pulse 345. Based on the count value generated by counter 340, output circuitry 350 generates signal OUT that carries a number of bits (e.g., 8 bits). The value of the bits is provided as part (e.g., a set of bits) of ID information 221.

After part of ID information 221 is obtained based on the selection of signal OSC1, ID generator circuit 220 can repeat the operation described above for each of signals OSC2, OSC3, and OSC4. For example, values 01, 10, and 11 may be provided to information SEL1 at different times, in order to select signals OSC2, OSC3, and OSC4, respectively. Thus, in this example, ID generator circuit 220 can perform four counting operations and generate four corresponding sets of bits. Since signals OSC1, OSC2, OSC3, and OSC4 have different frequencies, the four corresponding sets of bits can have different values. These four sets of bits can be used as the value (e.g., unique ID) for ID information 221. Thus, in this example, ID information 221 can include a number of sets of bits (e.g., four sets) that can be based on (e.g., equal to) the number of ring oscillators (e.g., 201, 202, 203, and 204) of authentication unit 103.

Figure 4:
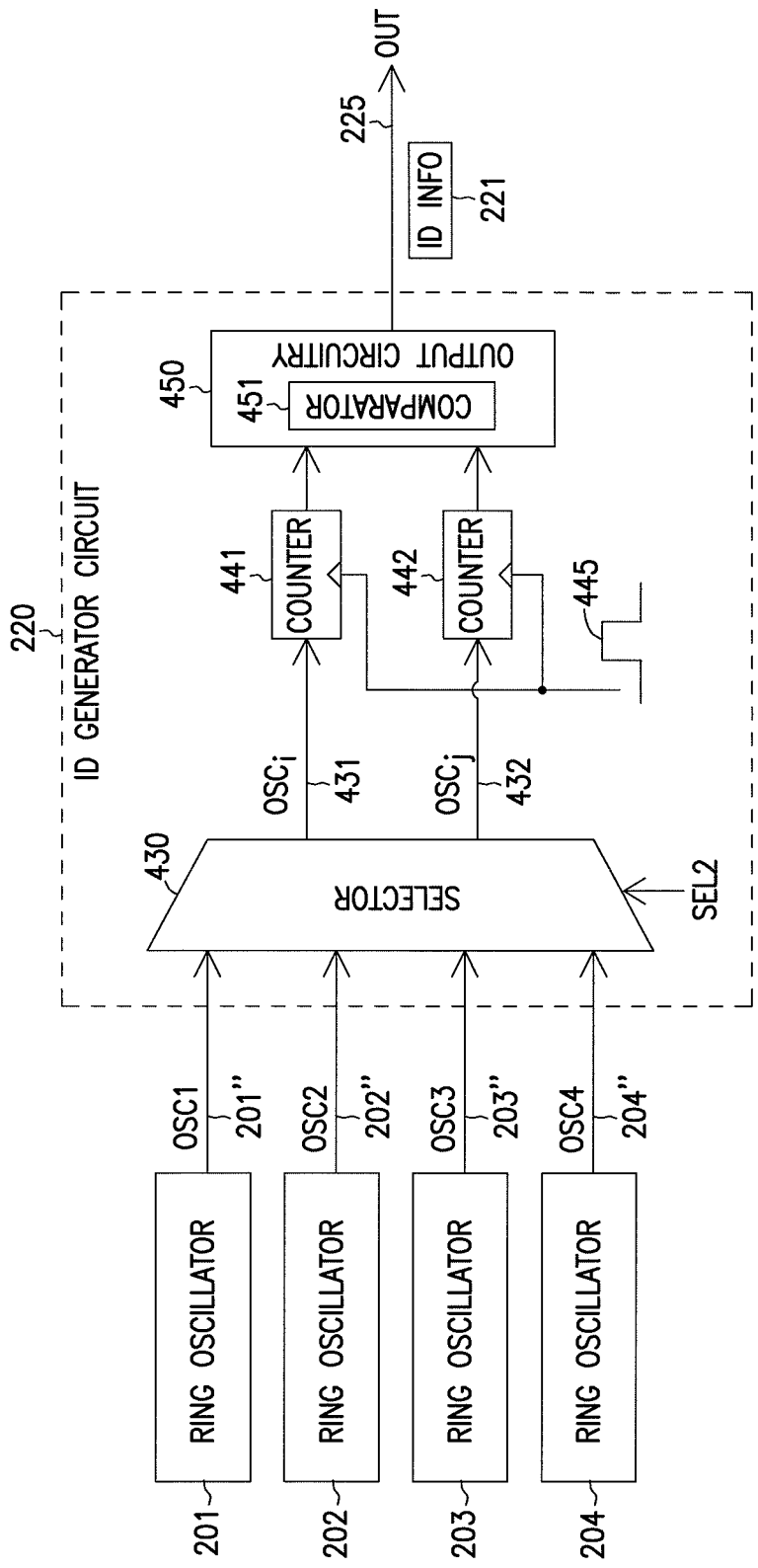
FIG. 4 shows a block diagram of the authentication unit of FIG. 2A, including an ID generator circuit having a selector, multiple counters, and output circuitry having a comparator, according to some embodiments described herein.

FIG. 4 shows a block diagram of authentication unit 103 of FIG. 2A including ID generator circuit 220 having a selector 430, multiple counters 441 and 442, and output circuitry 450 having a comparator 451, according to some embodiments described herein. FIG. 4 also shows ring oscillators 201, 202, 203, and 204 of authentication unit 103. However, for simplicity, detailed description of ring oscillators 201, 202, 203, and 204 is not repeated.

ID generator circuit 220 of FIG. 4 can be a variation of ID generator circuit 220 of FIG. 3. As described above with reference to FIG. 3, ID generator circuit 220 can generate ID information 221 based on an individual signal among signals OSC1, OSC2, OSC3, and OSC4. In FIG. 4, ID generator circuit 220 can generate ID information 221 based on comparisons between pairs of signals among signals OSC1, OSC2, OSC3, and OSC4.

As shown in FIG. 4, selector 430 (which can include a multi-input multi-output multiplexor) includes input nodes coupled to respective output nodes 201", 202", 203", and 204" of ring oscillators 201, 202, 203, and 204, respectively. Selector 430 can receive select information (e.g., a select signal or select signals) SEL2 to select one of signals OSC1, OSC2, OSC3, and OSC4 to be a signal $OSC_i$ and another one of signals OSC1, OSC2, OSC3, and OSC4 to be a signal $OSC_j$. Selector 430 can include output nodes (e.g., output nodes of the multiplexor of selector 430) 431 and 432 to provide signals $OSC_i$ and $OSC_j$, respectively. Different values (e.g., digital values) can be provided to select information SEL2 to select different pair of signals among signals OSC1, OSC2, OSC3, and OSC4.

Each of counters 441 and 442 can include an input node coupled to one of output nodes 431 and 432 of selector 430 to receive either signal OSC1 or $OSC_E$. Each of counters 441 and 442 can operate in ways similar to counter 340 (FIG. 3). For example, counter 441 can operate to generate a count that has a value based on the frequency (e.g., the number of periods) of signal OSC1 during a particular time interval. Counter 442 can operate to generate a count that has a value based on the frequency (e.g., the number of periods) of signal $OSC_j$ during a particular time interval. In operation, counters 441 and 442 can concurrently start (e.g., start at the same time) their respective counting operations and concurrently stop (e.g., stop at the same time) their respective counting operations. A pulse 445 can be provided to counters 441 and 442. The width of pulse 445 can be used as a time interval (duration) for the counting operations of counters 441 and 442. For example, counters 441 and 442 can start their respective counting operations at the rising edge of pulse 445 and stop their respective counting operations at the falling edge of pulse 445.

Output circuitry 450 can generate signal OUT at output node 225 of authentication unit 103. The value of information carried by signal OUT can be based on a comparison between count values generated by counters 441 and 442 within the same interval (e.g., the interval equal to the width of pulse 445). Comparator 451 can compare the count values generated by counters 441 and 442 and generate a comparison result based on the comparison. The comparison result can have a value represented by a single bit (or multiple bits). For example, the comparison result can have one value (e.g., binary "0") if the count value generated by counter 441 is greater than (or alternatively less than) the count value generated by counter 442 and another value (e.g., binary "1") if the count value generated by counter 441 is not greater than (or alternatively not less than) the count value generated by counter 442. Thus, in the example described here, for each comparison between the frequencies of signals $OSC_i$ and $OSC_j$ (two of signals OSC1, OSC2, OSC3, and OSC4), output circuitry 450 can generate a bit (e.g., "0" or "1") that can be provided as part of ID information 221. Therefore, in FIG. 4, ID information 221 can include a number of bits. Each of the bits can have a value (e.g., "0" or "1") based on comparison results from comparing the count values generated based on the frequencies of different pairs of signals among signals OSC1, OSC2, OSC3, and OSC4.

In generation of ID information 221, ID generator circuit 220 can operate to select a pair of signals (signal pair) among signals OSC1, OSC2, OSC3, and OSC4 one at a time and perform the counting operations and count comparison based on the selected signal pair. Part (e.g., a bit) of ID information 221 can include a comparison result from each signal pair. In order to generate a complete value (e.g., a number of bits) for ID information 221, ID generator circuit 220 can repeat the same counting operations and count comparison for different signal pairs among signals OSC1, OSC2, OSC3, and OSC4.

The signal pairs used for generation of ID information 221 can include signal pairs of only adjacent signals. Adjacent signals are signals (e.g., neighboring signals) from two oscillators (e.g., neighboring oscillators) that are physically located immediately next to each other. Thus, ID generator circuit 220 can generate ID information 221 based on signal pairs OSC1-OSC2 (signals OSC1 and OSC2), OSC2-OSC3 (signals OSC2 and OSC3), and OSC3-OSC4 (signals OSC3 and OSC4), which are signal pairs from only adjacent signals. In order to avoid any correlation, a signal pair (each of signal pairs OSC1-OSC2, OSC2-OSC3, and OSC3-OSC4) may be selected only one time during generation of ID information 221.

In alternative configuration, ID generator circuit 220 can generate ID information 221 based on signal pairs of adjacent signals and signal pairs of non-adjacent signals. Non-adjacent signals are signals from two oscillators that are not physically located immediately next to each other. Thus, in the alternative configuration, ID generator circuit 220 can generate ID information 221 based on signal pairs (from adjacent signals, as mentioned above) OSC1-OSC2, OSC2-OSC3, and OSC3-OSC4, and signal pairs (from non-adjacent signals) OSC1-OSC3, OSC1-OSC4, and OSC2-OSC4. In order to avoid any correlation in the alternative configuration, a signal pair (each of signal pairs OSC1-OSC2, OSC2-OSC3, OSC3-OSC4, OSC1-OSC3, OSC1-OSC4, and OSC2-OSC4) may be selected only one time during generation of ID information 221.

Figure 5:
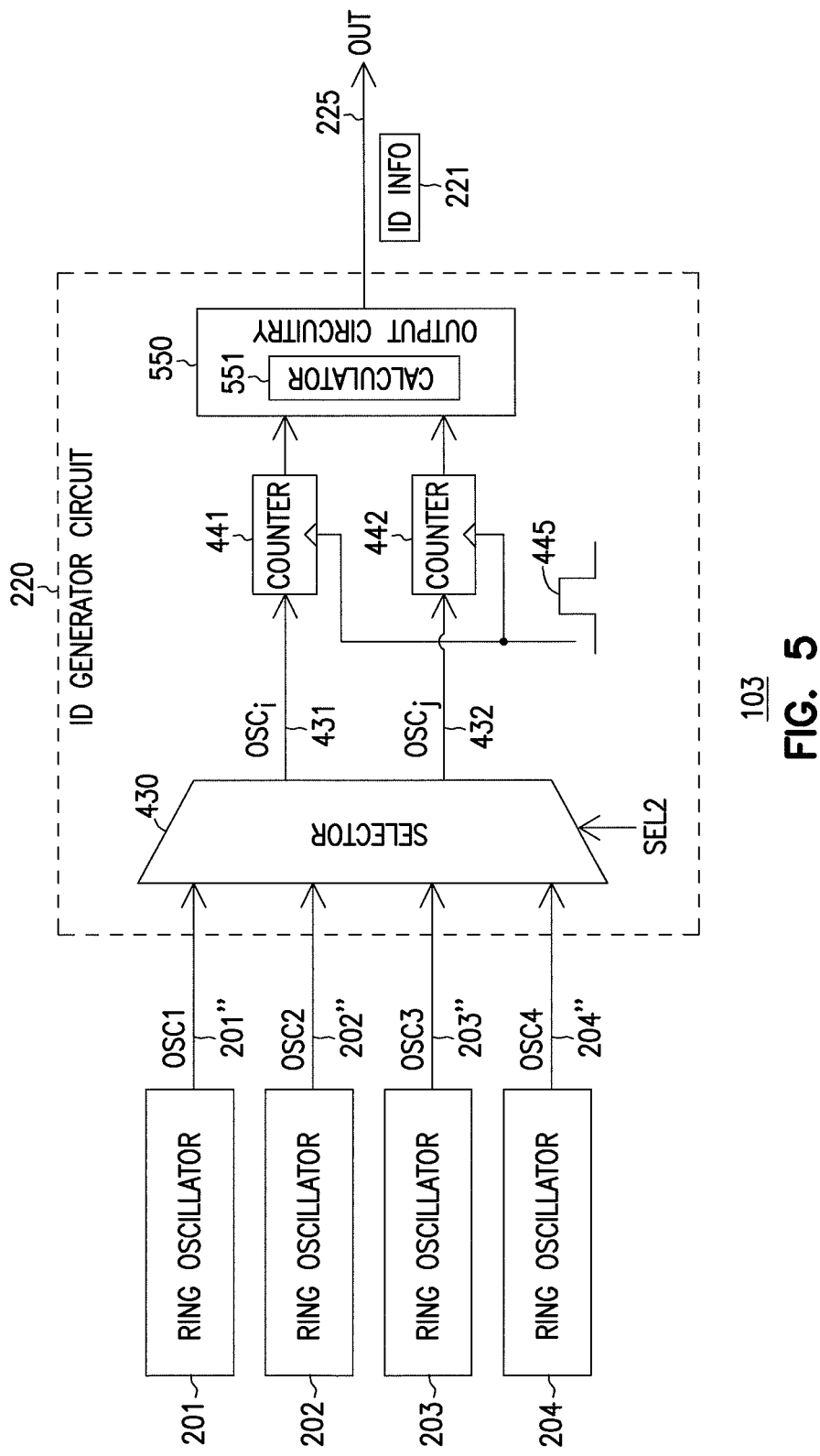
FIG. 5 shows a variation of the authentication unit of FIG. 4 where the ID generator circuit includes a calculator (e.g., logic calculating circuit), according to some embodiments described herein.

FIG. 5 shows a variation of authentication unit 103 of FIG. 4 where ID generator circuit 220 includes a calculator (e.g., logic calculating circuit) 551, according to some embodiments described herein. Authentication unit 103 of FIG. 5 can include components similar to or identical to the components of authentication unit 103 of FIG. 4, except for output circuitry 550 and calculator 551 in FIG. 5. For simplicity, detailed descriptions of similar or identical components are not repeated.

Output circuitry 550 can operate to generate signal OUT based on the amount of difference (e.g., delta) in values between a signal pair. This operation is different from the operation of output circuitry 450 of FIG. 4. As described above, the value of ID information 221 in FIG. 4 can be based on whether one count value is greater than (or alternatively less than) another count value, without determining the difference between two count values. In FIG. 5, output circuitry 550 can operate to calculate the difference between two count values. Thus, the value of information carried by signal OUT in FIG. 5 can be based on a difference between two count values that are generated based on the frequencies of different pairs of signals among signals OSC1, OSC2, OSC3, and OSC4.

Calculator 551 can include circuitry (e.g., logic circuits) that can calculate a difference between two count values and generate a resulting value. The resulting value can be represented by multiple bits. For example, if each of the count values generated by counters 441 and 442 has 8 bits, then the resulting value generated by calculator 551 can also have 8 bits (which indicates the difference in the two count values).

Thus, in FIG. 5, ID information 221 can include a number of sets of bits generated by output circuitry 550. Each set of bits can have a value (e.g., 8-bit value) based on a difference in two count values generated from a respective signal pair. The number of sets of bits can be based on (e.g., equal to) the number of signal pairs used by counters 441 and 442. The number of signal pairs can include signal pairs from only adjacent signals or alternatively signal pairs from adjacent signals and non-adjacent signals.

Figure 6:
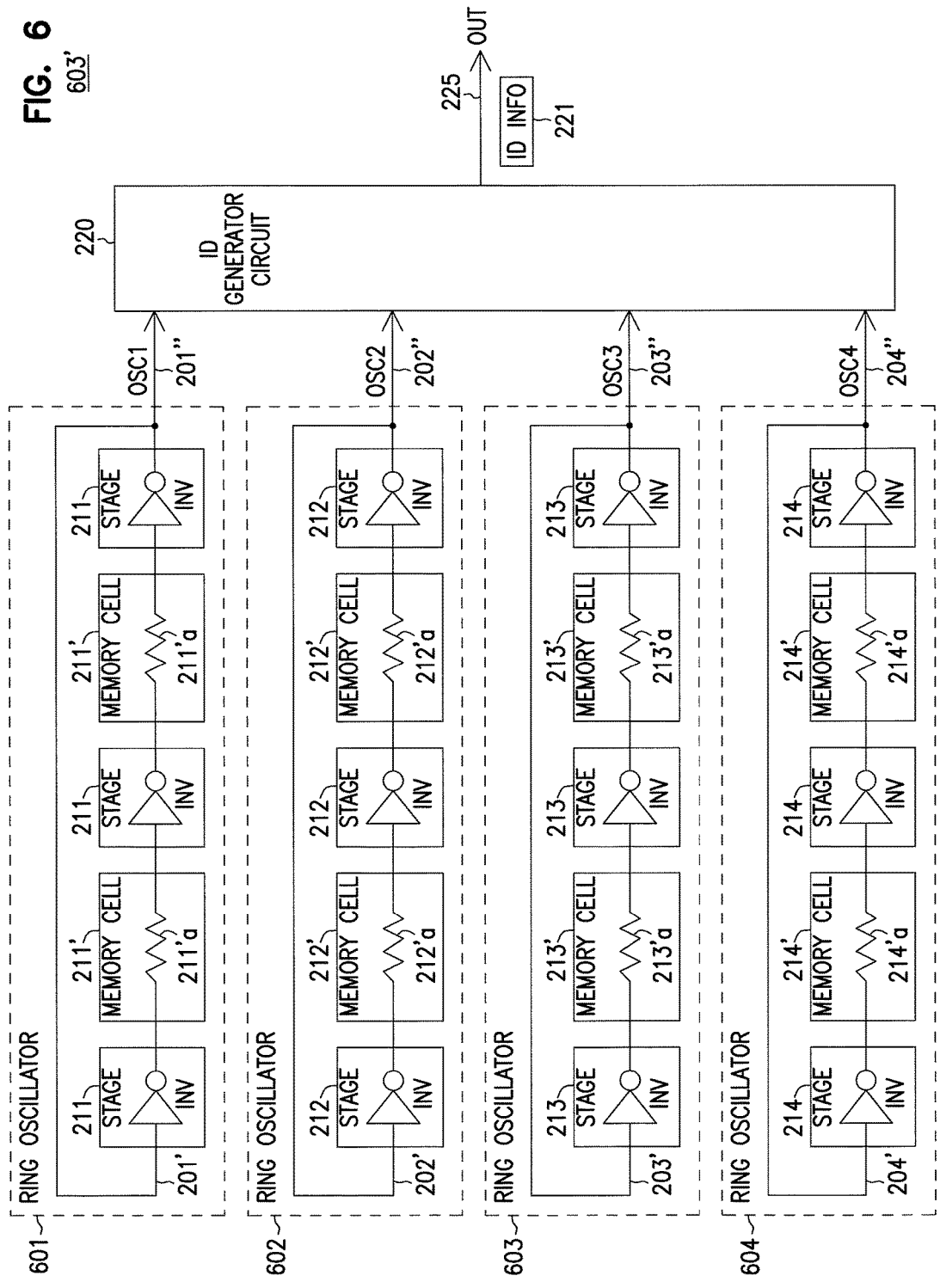
FIG. 6 shows a block diagram of an authentication unit including ring oscillators and multiple memory cells in each of the ring oscillators, according to some embodiments described herein.

FIG. 6 shows a block diagram of authentication unit 603' including ring oscillators 601, 602, 603, and 604, and multiple memory cells in each of ring oscillators 601, 602, 603, and 604, according to some embodiments described herein. Authentication unit 603' can be a variation of authentication unit 103 of FIG. 2A, FIG. 3, FIG. 4, and FIG. 5. Authentication unit 603' of FIG. 6 can include components similar to or identical to the components of authentication unit 103. For example, ID generator circuit 220 of FIG. 6 can be ID generator circuit 220 of FIG. 2A, FIG. 3, FIG. 4, or FIG. 5. For simplicity, detailed descriptions of similar or identical components are not repeated.

Differences between authentication unit 103 (FIG. 2A) and authentication unit 603' of FIG. 6 include the number of memory cells in each of ring oscillators 601, 602, 603, and 604 in FIG. 6. In FIG. 2A, each of ring oscillators 201, 202, 203, and 204 includes a single memory cell (e.g., 211', 212', 213', or 214'). In FIG. 6, each of ring oscillators 601, 602, 603, and 604 can include two memory cells coupled in series with and interleaved among the stages (inverter stages) of a respective ring oscillator. For example, as shown in FIG. 6, ring oscillator 601 can include two memory cells 211' coupled in series with and interleaved among the stages 211. Ring oscillator 602 can include memory cells 212' coupled in series with and interleaved among the stages 212. Ring oscillator 603 can include memory cells 213' coupled in series with and interleaved among the stages 213. Ring oscillator 604 can include two memory cells 214' coupled in series with and interleaved among the stages 214.

FIG. 6 shows an example where the memory cells in a respective oscillator are located at certain locations in the respective ring oscillator. However, the memory cells in a respective oscillator can be located anywhere within the respective ring oscillator. For example, a particular memory cell in a respective oscillator can be located at a location (e.g., immediately next to ID generator circuit 220) such that the particular memory cell can be directly coupled to the output node of the respective ring oscillator. In another example, the memory cells in a respective oscillator can be located next to each other such that the memory cells can be directly coupled to each other, without an inverter stage being coupled between the memory cells.

FIG. 6 shows an example where authentication unit 603' can include a certain the number (e.g., four) of ring oscillators, a certain number (e.g., three) of stages (e.g., inverter stages) in each ring oscillator, and a certain number (e.g., two) of memory cells (e.g., ReRAM cells) in each ring oscillator. However, authentication unit 603' can include different combinations of the number of ring oscillators, the number of stages in each ring oscillator, and the number of memory cells in each ring oscillator. Authentication unit 603' can include improvements over some conventional techniques, such as the improvements described above for authentication unit 103. However, using multiple memory cells in each of ring oscillators 601, 602, 603, and 604 in FIG. 6 may allow more combinations of states to be stored in memory cells 211', 212', 213', and 214' of authentication unit 603'. This may further improve the reliability (e.g., lower FAR and FRR) and strength of the value of ID information 221 generated by authentication unit 603'.

Figure 7:
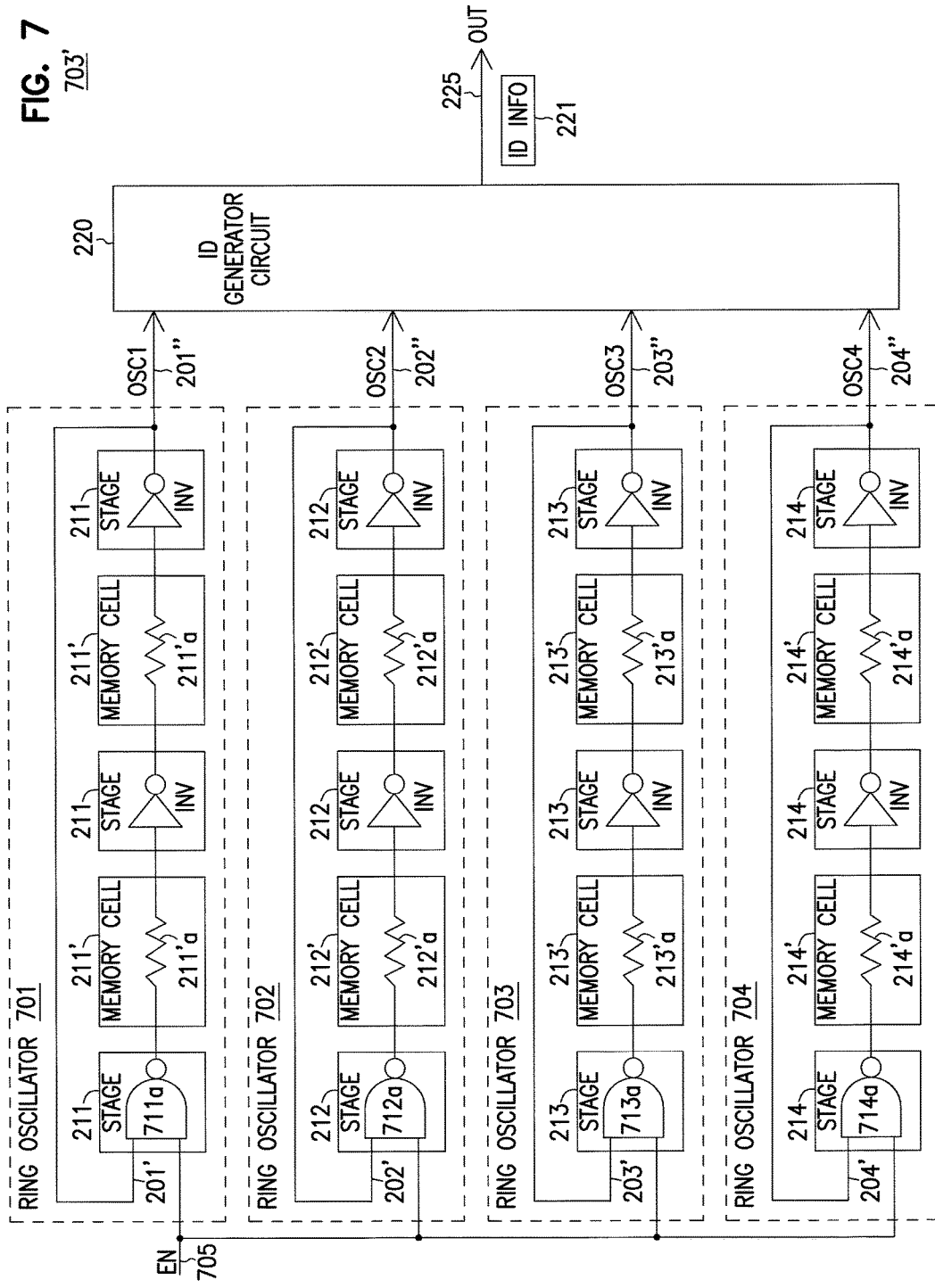
FIG. 7 shows a block diagram of an authentication unit including ring oscillators having an enable input node in each of the ring oscillators of the authentication unit, according to some embodiments described herein.

FIG. 7 shows a block diagram of authentication unit 703' including ring oscillators 701, 702, 703, and 704 having an enable node 705 in each of ring oscillators 701, 702, 703, and 704, according to some embodiments described herein. Authentication unit 703' can be a variation of authentication unit 603' of FIG. 6. Authentication unit 703' of FIG. 7 can include components similar to or identical to the components of authentication unit 603'. For simplicity, detailed descriptions of similar or identical components are not repeated.

Differences between authentication unit 603' (FIG. 6) and authentication unit 703' of FIG. 7 include a logic gate (e.g., NAND gate) in each of ring oscillators 701, 702, 703, and 704, respectively, in FIG. 7. As shown in FIG. 7, one of stages 211 of ring oscillator 701 can include a logic gate (e.g., NAND gate) 711a having an input node coupled to input node 201' of ring oscillator 701, another input node coupled to enable node 705, and an output node coupled to the input node of a succeeding stage among stages 211 of through memory cell 211'. Similarly, one of stages 212 of ring oscillator 702 can include a logic gate 712a having an input node coupled to input node 202', another input node coupled to enable node 705, and an output node coupled to the input node of a succeeding stage among stages 212 of through memory cell 212'. One of stages 213 of ring oscillator 703 can include a logic gate 713a having an input node coupled to input node 203', another input node coupled to enable node 705, and an output node coupled to the input node of a succeeding stage among stages 213 of through memory cell 213'. One of stages 214 of ring oscillator 704 can include a logic gate 714a having an input node coupled to input node 204', another input node coupled to enable node 705, and an output node coupled to the input node of a succeeding stage among stages 214 of through memory cell 214'.

In operation, signal EN can be activated to enable (e.g., to start) the generation of signals OSC1, OSC2, OSC3, and OSC4 by ring oscillators of ring oscillators 701, 702, 703, and 704, respectively. Signal EN can be deactivated to disable generation of signals OSC1, OSC2, OSC3, and OSC4. Including signal EN and stages 711, 712, 713, and 714 in authentication unit 703' may allow control of the activation (and deactivation) of signals OSC1, OSC2, OSC3, and OSC4 during generation of ID information 221. FIG. 7 shows an example where authentication unit 703' can include two memory cells in each of ring oscillators 701, 702, 703, and 704. However, authentication unit 703' can include only one memory cell in each of ring oscillators 701, 702, 703, and 704. Further, similar to authentication unit 603' of FIG. 6, authentication unit 703' of FIG. 7 can include any different combinations of the number of ring oscillators, the number of stages in each ring oscillator, and the number of memory cells in each ring oscillator.

Figure 8:
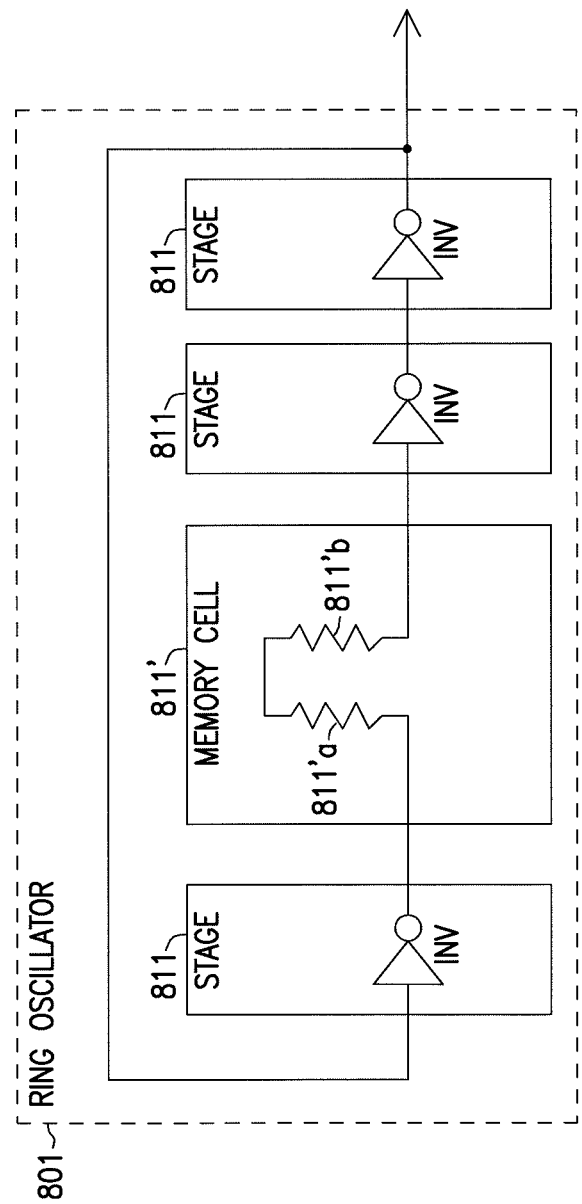
FIG. 8 shows a block diagram of a ring oscillator including stages and a memory cell having multiple memory elements, according to some embodiments described herein.

FIG. 8 shows a block diagram of a ring oscillator 801 including stages 811 and a memory cell 811' including memory elements 811'a and 811'b, according to some embodiments described herein. As shown in FIG. 8, memory elements 811'a and 811'b can be coupled in series with each other between terminals (e.g., two terminals) of memory cell 811' and in series with stages (e.g., CMOS inverter (INV) stages) 811 of ring oscillator 801. Each of memory elements 811'a and 811'b can include a ReRAM element. For example, each of memory elements 811'a and 811'b can include a dielectric portion (e.g., 273 of FIG. 2B) coupled between two electrodes (e.g., 271 and 272 of FIG. 2B). FIG. 8 shows an example where memory cell 811' includes two memory elements 811'a and 811'b coupled in series. However, memory cell 811' can include more than two memory elements coupled in series.

Part of ring oscillator 801 or the entire ring oscillator 801 can be included in any of the authentication units described above, such as authentication unit 103 (FIG. 2A), authentication unit 603' (FIG. 6), and authentication unit 703' (FIG. 7). For example, memory cell 811' of FIG. 8 can be substituted for each of memory cells 211', 212', 213', and 214' of authentication unit 103 (FIG. 2A, FIG. 3, FIG. 4, and FIG. 5), authentication unit 603' (FIG. 6), and authentication unit 703' (FIG. 7).

Figure 9:
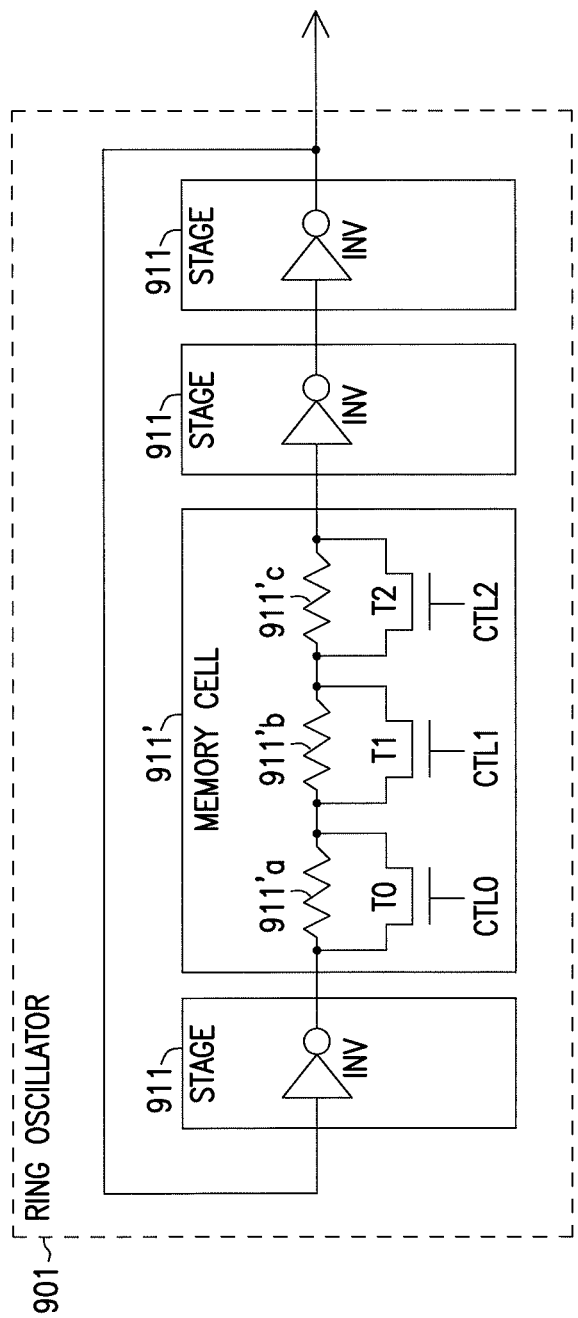
FIG. 9 shows a block diagram of a ring oscillator including stages and a memory cell having memory elements and associated transistors, according to some embodiments described herein.

FIG. 9 shows a block diagram of a ring oscillator 901 including stages 911 and a memory cell 911' including memory elements 911'a, 911'b, 911'c, and associated transistors T0, T1, and T2, according to some embodiments described herein. As shown in FIG. 9, memory elements 911'a, 911'b, and 911'c can be coupled in series with each other and in series with stages (e.g., CMOS inverter (INV) stages) 911 of ring oscillator 901. Each of memory elements 911'a, 911'b, and 911'c can include a ReRAM element. For example, each of memory elements 911'a, 911'b, and 911'c can include a dielectric portion (e.g., 273 of FIG. 2B) coupled between two electrodes (e.g., 271 and 272 of FIG. 2B).

As shown in FIG. 9, each of transistors T0, T1, and T2 includes transistor terminals (e.g., source and drain) coupled to respective terminals of an associated memory element. Transistors T0, T1, and T2 can be controlled (e.g., turned on or turned off) by signals (e.g., control signals) CTL0, CTL1, and CTL2, respectively. The value of the state that can be stored in memory cell 911' can be based on the resistance value across the combination of series-connected memory elements 911'a, 911'b, and 911'c. This resistance value can be adjusted (e.g., selected) by selectively turning on (or turn off) different numbers of transistors among transistors T0, T1, and T2. FIG. 9 shows an example where memory cell 911' includes three memory elements 911'a, 911'b, and 911'c coupled in series and three associated transistors T0, T1, and T2. However, the number of memory elements and associated transistors can vary.

Part of ring oscillator 901 or the entire ring oscillator 901 can be included in any of the authentication units described above, such as authentication unit 103 (FIG. 2A), authentication unit 603' (FIG. 6), and authentication unit 703' (FIG. 7). For example, memory cell 911' of FIG. 9 can be substituted for each of memory cells 211', 212', 213', and 214' of authentication unit 103 (FIG. 2A), authentication unit 603' (FIG. 6), and authentication unit 703' (FIG. 7).

Figure 10:
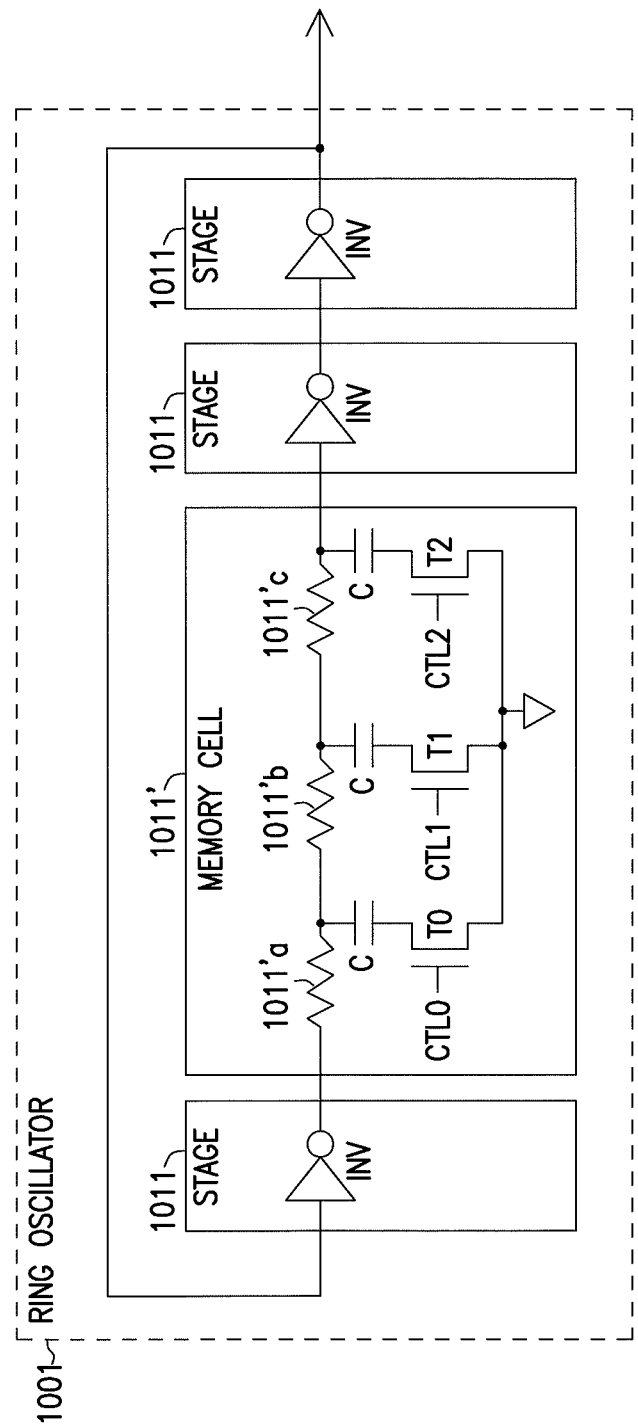
FIG. 10 shows a block diagram of a ring oscillator including stages and a memory cell having memory elements and associated capacitors and transistors, according to some embodiments described herein.

FIG. 10 shows a block diagram of a ring oscillator 1001 including stages 1011 and a memory cell 1011' including memory elements 1011'a, 1011'b, 1011'c, and associated capacitors C and transistors T0, T1, and T2, according to some embodiments described herein. As shown in FIG. 10, memory elements 1011'a, 1011'b, and 1011'c can be coupled in series with each other and in series with stages (e.g., CMOS inverter (INV) stages) 1011 of ring oscillator 1001. Each of memory elements 1011'a, 1011'b, and 1011'c can include a ReRAM element. For example, each of memory elements 1011'a, 1011'b, and 1011'c can include a dielectric portion (e.g., 273 of FIG. 2B) coupled between two electrodes (e.g., 271 and 272 of FIG. 2B).

As shown in FIG. 10, each of memory elements 1011'a, 1011'b, and 1011'c can be coupled in series with an associated capacitor C and an associated transistor (one of transistors T0, T1, and T2) with respect to a ground connection. Transistors T0, T1, and T2 can be controlled (e.g., turned on or turned off) by signals (e.g., control signals) CTL0, CTL1, and CTL2, respectively. The value of the state that can be stored in memory cell 1011' can based on the resistance value across the combination of series-connected memory elements 1011'a, 1011'b, and 1011'c. This resistance value can be adjusted (e.g., selected) by selectively turning on (or turn off) different numbers of transistors among transistors T0, T1, and T2. FIG. 10 shows an example where memory cell 1011' includes three memory elements 1011'a, 1011'b, and 1011'c coupled in series and three associated capacitors C and transistors T0, T1, and T2. However, the number of memory elements and associated capacitors and transistors can vary.

Part of ring oscillator 1001 or the entire ring oscillator 1001 can be included in any of the authentication units described above, such as authentication unit 103 (FIG. 2A), authentication unit 603' (FIG. 6), and authentication unit 703' (FIG. 7). For example, memory cell 1011' of FIG. 10 can be substituted for each of memory cells 211', 212', 213', and 214' of authentication unit 103 (FIG. 2A), authentication unit 603' (FIG. 6), and authentication unit 703' (FIG. 7).

Figure 11:
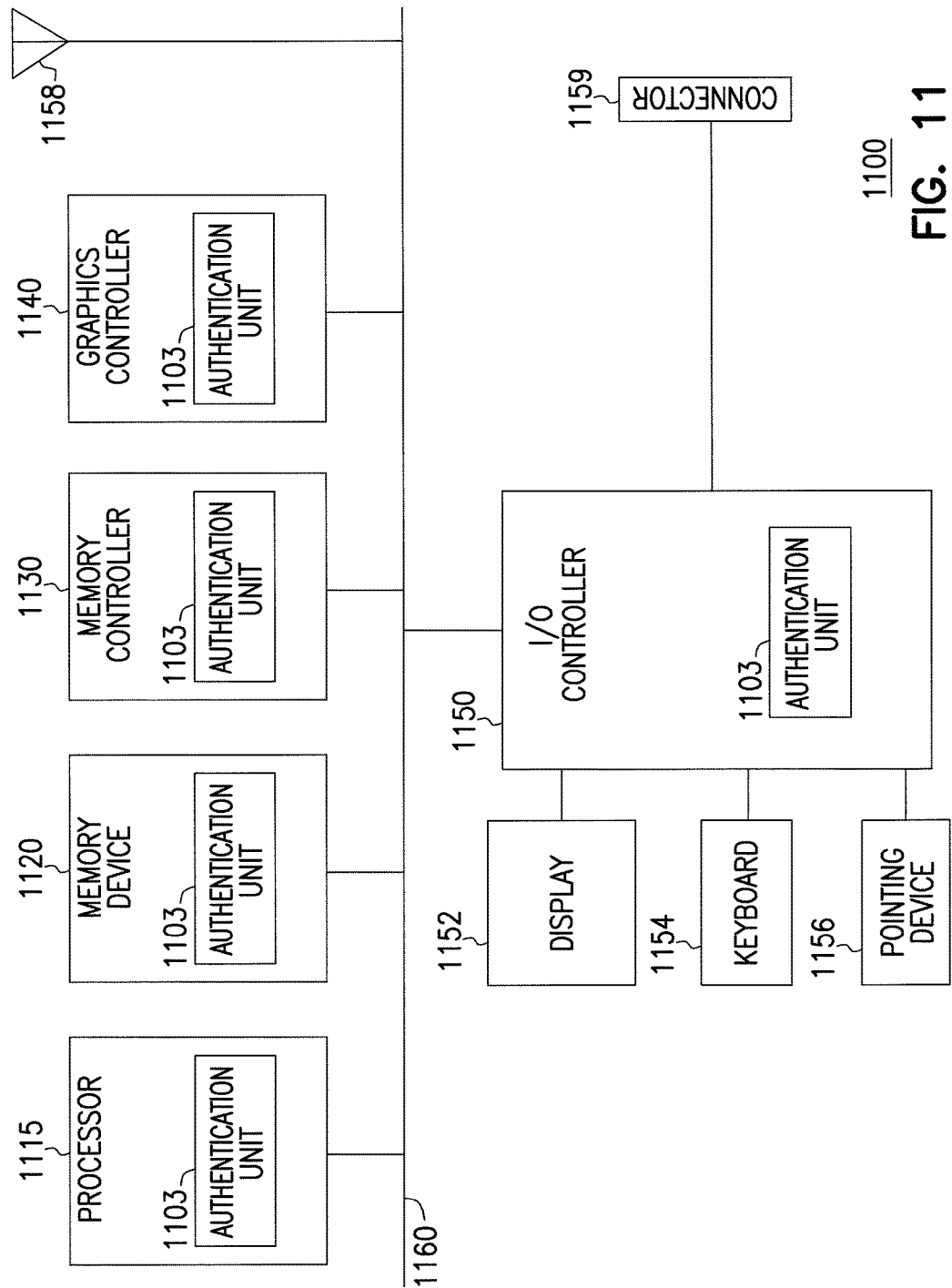
FIG. 11 shows an apparatus in the form of a system (e.g., electronic system), according to some embodiments described herein.

FIG. 11 shows an apparatus in the form of a system (e.g., electronic system) 1100, according to some embodiments described herein. System 1100 can include or be included in a computer, a tablet, or other electronic systems. As shown in FIG. 11, system 1100 can include components such as a processor 1115, a memory device 1120, a memory controller 1130, a graphics controller 1140, an input and output (I/O) controller 1150, a display 1152, a keyboard 1154, a pointing device 1156, at least one antenna 1158, a connector 1159, and a bus 1160. Bus 1160 can include conductive lines (e.g., metal-based traces on a circuit board where the components of system 1100 are located).

In some arrangements, system 1100 does not have to include a display. Thus, display 1152 can be omitted from system 1100. In some arrangements, system 1100 does not have to include any antenna. Thus, antenna 1158 can be omitted from system 1100.

Processor 1115 can include a general-purpose processor or an application specific integrated circuit (ASIC). Processor 1115 can include a central processing unit (CPU).

Memory device 1120 can include a dynamic random access memory (DRAM) device, a static random access memory (SRAM) device, a flash memory device, a phase change memory device, a combination of these memory devices, or other types of memory. FIG. 11 shows an example where memory device 1120 is a stand-alone memory device separated from processor 1115. In an alternative arrangement, memory device 1120 and processor 1115 can be located on the same die. In such an alternative arrangement, memory device 1120 is an embedded memory in processor 1115, such as embedded DRAM (eDRAM), embedded SRAM (eSRAM), embedded flash memory, or another type of embedded memory.

Display 1152 can include a liquid crystal display (LCD), a touchscreen (e.g., capacitive or resistive touchscreen), or another type of display. Pointing device 1156 can include a mouse, a stylus, or another type of pointing device.

I/O controller 1150 can include a communication module for wired or wireless communication (e.g., communication through one or more antennas 1158). Such wireless communication may include communication in accordance with WiFi communication technique, Long Term Evolution Advanced (LTE-A) communication technique, or other communication techniques.

I/O controller 1150 can also include a module to allow system 1100 to communicate with other devices or systems in accordance with one or more standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), and other specifications.

Connector 1159 can be arranged (e.g., can include terminals, such as pins) to allow system 1100 to be coupled to an external device (or system). This may allow system 1100 to communicate (e.g., exchange information) with the external device (or system) through connector 1159. Connector 1159 includes components (e.g., pins and conductive lines) such that it can conform with at least one of USB, DP, HDMI, Thunderbolt, PCIe, and other specifications.

As shown in FIG. 11, each of processor 1115, memory device 1120, memory controller 1130, graphics controller 1140, and I/O controller 1150 can include an authentication unit 1103. Authentication unit 1103 can include any of the authentication units described above with reference to FIG. 1 through FIG. 10.

FIG. 11 shows an example where each of processor 1115, memory device 1120, memory controller 1130, graphics controller 1140, and I/O controller 1150 includes authentication unit 1103. However, in some arrangements, some of processor 1115, memory device 1120, memory controller 1130, graphics controller 1140, and I/O controller 1150 may not include authentication unit 1103.

FIG. 11 shows the components of system 1100 arranged separately from each other as an example. For example, each of processor 1115, memory device 1120, memory controller 1130, graphics controller 1140, and I/O controller 1150 can be located on a separate IC (e.g., separate semiconductor die). In some arrangements, two or more components (e.g., processor 1115, memory device 1120, graphics controller 1140, and I/O controller 1150) of system 1100 can be located on the same die (e.g., same IC) that forms a system-on-chip, or located on the same IC package that forms a system-on-package (SoP) or system-in-package (SiP).

Figure 12:
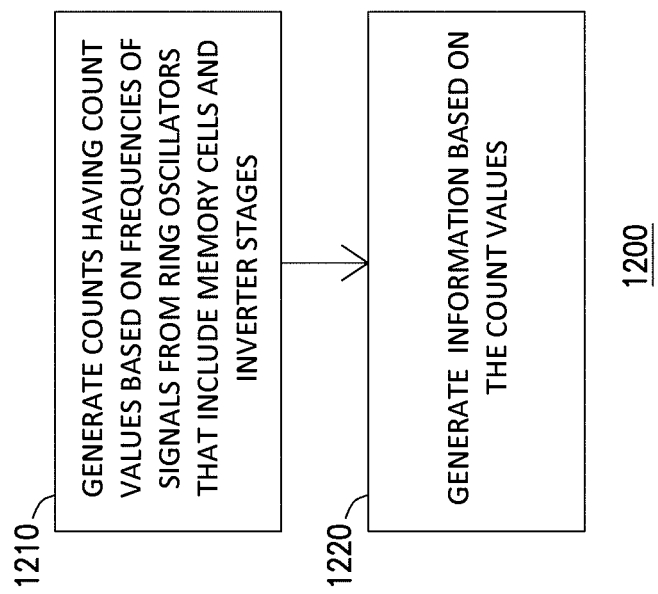
FIG. 12 is a flowchart showing a method of operating an electronic apparatus, according to some embodiments described herein.

FIG. 12 is a flowchart showing a method 1200 of operating an electronic apparatus, according to some embodiments described herein. The electronic apparatus used in method 1200 can include apparatuses described above with reference to FIG. 1 through FIG. 11, such as device 100 and system 1100 that can include authentication units 103 and 1103. Some of the activities in method 1200 may be performed by hardware, software, firmware, or any combination of hardware, software, and firmware.

As shown in FIG. 12, activity 1210 of method 1200 can include generating counts having count values based on frequencies of signals from ring oscillators. Each of the ring oscillators can include inverter stages and at least one memory cell coupled to the inverter stages. The ring oscillators and the memory cell (or memory cells) can be part of an authentication unit, such as authentication unit 103 and 1103. Activity 1220 of method 1200 can include generating information based on the count values generated in activity 1210. The information generated by activity 1220 can include ID information (e.g., ID information 221 in FIG. 2A) that can be used to authenticate a device (e.g., device 100) or a system (e.g., system 1100) that contains the authentication unit.

Method 1200 can include fewer or more activities relative to activities 1210 and 1220 in FIG. 12. For example, method 1200 can include activities and operations of authentication units 103 and 1103 including activities and operations of ID generator circuit 220 described above with reference to FIG. 2A through FIG. 7.

The illustrations of the apparatuses (e.g., device 100 and system 1100 that can include authentication units 103 and 1103) and methods (e.g., method 1200 and operations of device 100 and system 1100 that can include operations of authentication units 103 and 1103) described above are intended to provide a general understanding of the structure of different embodiments and are not intended to provide a complete description of all the elements and features of an apparatus that might make use of the structures described herein. The apparatuses and methods described above can include or be included in high-speed computers, communication and signal processing circuitry, single-processor modules or multi-processor modules, single embedded processors or multiple embedded processors, multi-core processors, message information switches, and application-specific modules including multilayer or multi-chip modules. Such apparatuses may further be included as subcomponents within a variety of other apparatuses (e.g., electronic systems), such as televisions, cellular telephones, personal computers (e.g., laptop computers, desktop computers, handheld computers, etc.), tablets (e.g., tablet computers), wearable electronic things (e.g., smart watches), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

Additional Notes and Examples

Example 1 includes subject matter (such as a device, an electronic apparatus (e.g., circuit, electronic system, or both), or a machine) including a first ring oscillator including a first memory cell and a first plurality of stages coupled to the first memory cell, a second ring oscillator including a second memory cell and a second plurality of stages coupled to the second memory cell, and a circuit including a first input node coupled to an output node of the first ring oscillator and a second input node coupled to an output node of the second ring oscillator.

In Example 2, the subject matter of Example 1 may optionally include, wherein the circuit is to receive a first signal from the first ring oscillator and a second signal from the second ring oscillator and to generate information based on frequencies of the first and second signals.

In Example 3, the subject matter of Example 1 may optionally include, wherein the first memory cell includes a first terminal and a second terminal, the first terminal coupled to an output node of a first stage of the first plurality of stages, the second terminal coupled to an input node of a second stage of the first plurality of stages, and the second memory cell includes a first terminal and a second terminal, the first terminal of the second memory cell coupled to an output node of a first stage of the second plurality of stages, the second terminal of the second memory cell coupled to an input node of a second stage of the second plurality of stages.

In Example 4, the subject matter of Example 3 may optionally include, wherein the first memory cell includes a first memory element coupled to the first and second terminals of the first memory cell, and the second memory cell includes a second memory element coupled to the first and second terminals of the second memory cell.

In Example 5, the subject matter of Example 4 may optionally include, wherein the first memory cell includes a first additional memory element coupled in series with the first memory element between the first and second terminals of the first memory cell, and the second memory cell includes a second additional memory element coupled in series with the second memory element between the first and second terminals of the second memory cell.

In Example 6, the subject matter of any Examples 1-5 may optionally include, wherein the circuit includes a selector, the selector including a first input node coupled to the output node of the first ring oscillator and a second input node coupled to the output node of the second ring oscillator.

In Example 7, the subject matter of Example 6 may optionally include, wherein the circuit includes a counter coupled to an output node of the selector.

In Example 8, the subject matter of Example 1 or 2 may optionally include, wherein the first memory cell includes a memory element coupled to a terminal of the first memory cell, and transistor including source and drain coupled to respective terminals of the memory element.

In Example 9, the subject matter of Example 1 or 2 may optionally include, wherein the first memory cell includes a memory element coupled to a terminal of the first memory cell, and a capacitor and transistor coupled in series with the memory element.

In Example 10, the subject matter of Example 1 or 2 may optionally include, wherein a stage among the first plurality of stages includes a logic gate, the logic gate including a first input node coupled to an input node of the first ring oscillator, and a second input node coupled to an enable node, and a stage among the second plurality of stages includes a logic gate, the logic gate including a first input node coupled to an input node of the second ring oscillator, and a second input node coupled to the enable node.

Example 11 includes subject matter (such as a device, an electronic apparatus (e.g., circuit, electronic system, or both), or a machine) including a first ring oscillator including a first inverter, a second inverter, and a first resistive memory element, the first resistive memory element coupled between an output node of the first inverter and an input node of the second inverter, a second ring oscillator including a third inverter, a fourth inverter, and a second resistive memory element, the second resistive memory element coupled between an output node of the third inverter and an input node of the fourth inverter, and a circuit including a multiplexor coupled to the first and second ring oscillators.

In Example 12, the subject matter of Example 11 may optionally include, wherein the apparatus comprises a device, and the circuit is to generate identification information to authenticate the device.

In Example 13, the subject matter of Example 11 or 12 may optionally include, wherein the first ring oscillator includes an additional first resistive memory element coupled in series with the first resistive memory element between the output node of the first inverter and the input node of the second inverter, and the second ring oscillator includes an additional second resistive memory element coupled in series with the second resistive memory element between the output node of the third inverter and the input node of the fourth inverter.

In Example 14, the subject matter of Example 11 or 12 may optionally include, wherein each of first and second resistive memory elements includes a dielectric portion and a conductive path in the dielectric portion.

In Example 15, the subject matter of Example 11 or 12 may optionally include, wherein each of the first and second resistive memory elements includes electrodes and a dielectric portion between the electrodes, and the electrodes and the dielectric portion are arranged among each other in a direction perpendicular to a semiconductor substrate.

In Example 16, the subject matter of Example 11 or 12 may optionally include, wherein the circuit includes a counter coupled to the multiplexor.

In Example 17, the subject matter of Example 16 may optionally include, wherein the circuit includes a comparator coupled to the counter.

Example 18 includes subject matter (such as a device, an electronic apparatus (e.g., circuit, electronic system, or both), or a machine) including dynamic random access memory (DRAM) device, and a processor coupled to the DRAM device, the processor including a first ring oscillator including a first memory cell and a first plurality of stages coupled to the first memory cell, a second ring oscillator including a second memory cell and a second plurality of stages coupled to the second memory cell, and a circuit including a first input node coupled to an output node of the first ring oscillator and a second input node coupled to an output node of the second ring oscillator.

In Example 19, the subject matter of Example 18 may optionally include, further comprising a semiconductor substrate, wherein the DRAM is located at a first location of the semiconductor substrate, and the processor is located at a second location of the semiconductor substrate.

In Example 20, the subject matter of Example 18 or 19 may optionally include, further comprising a connector coupled to the processor, the connector conforming with one of Universal Serial Bus (USB), High-Definition Multimedia Interface (HDMI), Thunderbolt, and Peripheral Component Interconnect Express (PCIe).

Example 21 includes subject matter (such as a method of operating a device, an electronic apparatus (e.g., circuit, electronic system, or both), or a machine) including generating counts having count values based on frequencies of signals from ring oscillators, each of the ring oscillators including inverter stages and at least one memory cell coupled to the inverter stages, and generating information based on the count values.

In Example 22, the subject matter of Example 21 may optionally include, wherein generating the information includes comparing a first count value included in the count values with a second count value included in the count values, and generating part of the information, the part of the information having a value based on whether the first count value is greater than the second count value.

In Example 23, the subject matter of Example 22 may optionally include, wherein generating the part of the information includes generating a bit, the bit having a first value if the first count value is greater than the second count value and a second value if the first count value is not greater than the second count value.

In Example 24, the subject matter of Example 21 may optionally include, wherein generating the information includes comparing a first count value included in the count values with a second count value included in the count values, and generating part of the information, the part of the information having a value based on a difference between the first count value and the second count value.

In Example 25, the subject matter of Example 21 may optionally include, wherein generating the counts includes generating a first count of the counts based on a frequency of a first signal among the signals, the first count having a first count value, generating a second count of the counts based on a frequency of a second signal among the signals, the second count having a second count value, and generating part of the information based on the first and second count values, wherein the first signal is generated by a first ring oscillator of the ring oscillators, the second signal is generated by a second ring oscillator of the ring oscillators, and the first and second ring oscillators are located immediately next to each other.

Example 26, includes subject matter (such as a device, an electronic apparatus (e.g., circuit, electronic system, or both), or machine) including means for performing any of the methods of claims 21-25.

The subject matter of Example 1 through Example 26 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    a first ring oscillator including a first memory cell and a first plurality of stages coupled to the first memory cell;
    a second ring oscillator including a second memory cell and a second plurality of stages coupled to the second memory cell;
    a circuit including a first input node coupled to an output node of the first ring oscillator and a second input node coupled to an output node of the second ring oscillator, wherein
    the first memory cell includes a first terminal and a second terminal, the first terminal coupled to an output node of a first stage of the first plurality of stages, the second terminal coupled to an input node of a second stage of the first plurality of stages;
    the second memory cell includes a first terminal and a second terminal, the first terminal of the second memory cell coupled to an output node of a first stage of the second plurality of stages the second terminal of the second memory cell coupled to an input node of a second stage of the second plurality of stages;
    the first memory cell includes a first memory element coupled to the first and second terminals of the first memory cell, and the second memory cell includes a second memory element coupled to the first and second terminals of the second memory cell; and
    the first memory cell includes a first additional memory element coupled in series with the first memory element between the first and second terminals of the first memory cell, and the second memory cell includes a second additional memory element coupled in series with the second memory element between the first and second terminals of the second memory cell.

2. The apparatus of claim 1, wherein the circuit is to receive a first signal from the first ring oscillator and a second signal from the second ring oscillator and to generate information based on frequencies of the first and second signals.

3. The apparatus of claim 1, wherein the circuit includes a selector, the selector including a first input node coupled to the Output node of the first ring oscillator and a second input node coupled to the output node of the second ring oscillator.

4. The apparatus of claim 3, wherein the circuit includes a counter coupled to an output node of the selector.

5. The apparatus of claim 1, wherein:
    a stage among the first plurality of stages includes a logic gate, the logic gate including a first input node coupled to an input node of the first ring oscillator, and a second input node coupled to an enable node; and
    a stage among the second plurality of stages includes a logic gate, the logic gate including a first input node coupled to an input node of the second ring oscillator, and a second input node coupled to the enable node.

6. An apparatus comprising:
a first ring oscillator including a first memory cell and a first plurality of stages coupled to the first memory cell;
a second ring oscillator including a second memory cell and a second plurality of stages coupled to the second memory cell; and
a circuit including a first input node coupled to an output node of the first ring oscillator and a second input node coupled to an output node of the second ring oscillator, wherein the first memory cell includes a memory' element coupled to a terminal of the first memory cell, and transistor including source and drain coupled to respective terminals of the memory element.

7. An apparatus comprising:
a first ring oscillator including a first memory cell and a first plurality of stages coupled to the first memory cell;
a second ring oscillator including a second memory cell and a second plurality of stages coupled to the second memory cell; and
a circuit including a first input node coupled to an output node of the first ring oscillator and a second input node coupled to an output node of the second ring oscillator, wherein the first memory cell includes a memory element coupled to a terminal of the first memory cell, and a capacitor and transistor coupled in series with the memory element.

8. An apparatus comprising:
a first ring oscillator including a first inverter, a second inverter, and a first resistive memory element, the first resistive memory element coupled between an output node of the first inverter and an input node of the second inverter;
a second ring oscillator including a third inverter, a fourth inverter, and a second resistive memory element, the second resistive memory element coupled between an output node of the third inverter and an input node of the fourth inverter; and
a circuit including a multiplexor coupled to the first and second ring oscillators.

9. The apparatus of claim 8, wherein the apparatus comprises a device, and the circuit is to generate identification information to authenticate the device.

10. The apparatus of claim 8, wherein the first ring oscillator includes an additional first resistive memory element coupled in series with the first resistive memory element between the output node of the first inverter and the input node of the second inverter, and the second ring oscillator includes an additional second resistive memory element coupled in series with the second resistive memory element between the output node of the third inverter and the input node of the fourth inverter.

11. The apparatus of claim 8, wherein each of first and second resistive memory elements includes a dielectric portion and a conductive path in the dielectric portion.

12. The apparatus of claim 8, wherein each of the first and second resistive memory elements includes electrodes and a dielectric portion between the electrodes, and the electrodes and the dielectric portion are arranged among each other in a direction perpendicular to a semiconductor substrate.

13. The apparatus of claim 8, wherein the circuit includes a counter coupled to the multiplexor.

14. The apparatus of claim 13, wherein the circuit includes a comparator coupled to the counter.

15. An apparatus comprising:
dynamic random access memory (DRAM) device; and
a processor coupled to the DRAM device, the processor including:
a first ring oscillator including a first memory cell and a first plurality of stages coupled to the first memory cell, the first memory cell including a first resistive memory element coupled between an output node of a first stage of the first plurality of stages and an input node of a second stage of the first plurality of stages;
a second ring oscillator including a second memory cell and a second plurality of stages coupled to the second memory cell, the second memory cell including a second resistive memory element coupled between an output node of a first stage of the second plurality of stages and an input node of a second stage of the second plurality of stages; and
a circuit including a first input node coupled to an output node of the first ring oscillator and a second input node coupled to an output node of the second ring oscillator.

16. The apparatus of claim 15, further comprising a semiconductor substrate, wherein the DRAM is located at a first location of the semiconductor substrate, and the processor is located at a second location of the semiconductor substrate.

17. The apparatus of claim 15, further comprising a connector coupled to the processor, the connector conforming with one of Universal Serial Bus (USB), High-Definition Multimedia interface (HDMI), Thunderbolt, and Peripheral Component interconnect Express (PCIe).

* * * * *